United States Patent
Ge et al.

(10) Patent No.: US 12,149,584 B2
(45) Date of Patent: Nov. 19, 2024

(54) APPLICATION RELOCATION METHOD AND APPARATUS

(71) Applicant: HUAWEI TECHNOLOGIES CO., LTD., Shenzhen (CN)

(72) Inventors: Cuili Ge, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 17/562,742

(22) Filed: Dec. 27, 2021

(65) Prior Publication Data

US 2022/0124147 A1 Apr. 21, 2022

Related U.S. Application Data

(63) Continuation of application No. PCT/CN2020/097770, filed on Jun. 23, 2020.

(30) Foreign Application Priority Data

Jun. 28, 2019 (CN) .......... 201910579271.X
Nov. 19, 2019 (CN) .......... 201911137003.9

(51) Int. Cl.
*H04L 67/1021* (2022.01)
*H04W 4/02* (2018.01)
(Continued)

(52) U.S. Cl.
CPC ......... *H04L 67/1021* (2013.01); *H04W 4/025* (2013.01); *H04W 4/50* (2018.02); *H04W 40/248* (2013.01)

(58) Field of Classification Search
CPC . H04W 72/23; H04W 36/0033; H04W 24/10; H04W 36/14; H04W 36/0022;
(Continued)

(56) References Cited

U.S. PATENT DOCUMENTS

| | | | |
|---|---|---|---|
| 2018/0263039 A1* | 9/2018 | Fang | H04W 72/53 |
| 2018/0352051 A1 | 12/2018 | Tsai et al. | |
| 2019/0191344 A1* | 6/2019 | Wen | H04W 36/0061 |

FOREIGN PATENT DOCUMENTS

| | | |
|---|---|---|
| CN | 104219722 A | 12/2014 |
| CN | 107018539 A | 8/2017 |

(Continued)

OTHER PUBLICATIONS

"3rd Generation Partnership Project; Technical Specification Group Services and System Aspects; Architecture enhancements to facilitate communications with packet data networks and applications (Release 16)," 3GPP TS 23.682 V16.3.0, pp. 1-132, 3rd Generation Partnership Project, Valbonne, France (Jun. 2019).

(Continued)

*Primary Examiner* — Kwasi Karikari
(74) *Attorney, Agent, or Firm* — Leydig, Voit & Mayer, Ltd.

(57) ABSTRACT

An application relocation method includes: a source edge enabler server (EES) sends a first message to a target EES, where the first message is used to request to relocate an application of a terminal apparatus, and the first message includes an identifier of the terminal apparatus and an identifier of the application; and the source EES receives a second message from the target EES, where the second message is a response message of the first message, and the second message is used to indicate whether a relocation of the application of the terminal apparatus is allowed.

20 Claims, 7 Drawing Sheets

(51) Int. Cl.
*H04W 4/50* (2018.01)
*H04W 40/24* (2009.01)

(58) Field of Classification Search
CPC ..... H04W 36/08; H04W 76/27; H04W 80/10; H04W 48/18; H04W 76/30; H04W 36/0016; H04W 76/10; H04W 76/11; H04W 76/19; H04W 88/14; H04W 8/24; H04W 36/0058; H04W 72/20; H04W 76/18; H04W 76/22; H04W 8/08; H04W 36/0079; H04W 12/06; H04W 76/12; H04W 36/32; H04W 36/18; H04W 8/02; H04W 92/18; H04W 72/044; H04W 76/15; H04W 28/24; H04W 40/36; H04W 36/0085; H04W 48/20; H04W 72/1263; H04W 36/023; H04W 36/0088; H04W 36/305; H04W 72/53; H04W 36/24; H04W 28/22; H04W 36/10; H04W 72/52; H04W 84/005

See application file for complete search history.

(56) References Cited

FOREIGN PATENT DOCUMENTS

| | | |
|---|---|---|
| CN | 107027153 A | 8/2017 |
| CN | 107305502 A | 10/2017 |
| CN | 108632813 A | 10/2018 |
| CN | 109429284 A | 3/2019 |
| CN | 109889599 A | 6/2019 |
| CN | 109933287 A | 6/2019 |
| WO | 2017091960 A1 | 6/2017 |
| WO | 2017128702 A1 | 8/2017 |
| WO | 2018191977 A1 | 10/2018 |

OTHER PUBLICATIONS

"3rd Generation Partnership Project; Technical Specification Group Services and System Aspects; Functional stage 2 description of Location Services (LCS) (Release 15)," 3GPP TS 23.271 V15.1.0, pp. 1-184, 3rd Generation Partnership Project, Valbonne, France (Sep. 2018).

"3rd Generation Partnership Project; Technical Specification Group Services and System Aspects; 5G System (5GS) Location Services (LCS); Stage 2 (Release 16)," 3GPP TS 23.273 V16.0.0, pp. 1-86, 3rd Generation Partnership Project, Valbonne, France (Jun. 2019).

"3rd Generation Partnership Project; Technical Specification Group Radio Access Network; NG Radio Access Network (NG-RAN); Stage 2 functional specification of User Equipment (UE) positioning in NG-RAN (Release 15)," 3GPP TS 38.305 V15.3.0, pp. 1-69, 3rd Generation Partnership Project, Valbonne, France (Mar. 2019).

"3rd Generation Partnership Project; Technical Specification Group Services and System Aspects; Policy and Charging Control Framework for the 5G System; Stage 2 (Release 16)," 3GPP TS 23.503 V16.1.0, pp. 1-99, 3rd Generation Partnership Project, Valbonne, France (Jun. 2019).

"3rd Generation Partnership Project; Technical Specification Group Services and System Aspects; Architecture enhancements for 5G System (5GS) to support network data analytics services (Release 16)," 3GPP TS 23.288 V16.0.0, pp. 1-52, 3rd Generation Partnership Project, Valbonne, France (Jun. 2019).

"3rd Generation Partnership Project; Technical Specification Group Services and System Aspects; Procedures for the 5G System; Stage 2 (Release 16)," 3GPP TS 23.502 V16.1.1, total 495 pages, 3rd Generation Partnership Project, Valbonne, France (Jun. 2019).

"3rd Generation Partnership Project; Technical Specification Group Services and System Aspects; System Architecture for the 5G System; Stage 2 (Release 16)," 3GPP TS 23.501 V16.1.0, total 368 pages, 3rd Generation Partnership Project, Valbonne, France (Jun. 2019).

* cited by examiner

APPLICATION RELOCATION METHOD AND APPARATUS

CROSS-REFERENCE TO RELATED APPLICATIONS

This application is a continuation of International Application No. PCT/CN2020/097770, filed on Jun. 23, 2020, which claims priority to Chinese Patent Application No. 201911137003.9, filed on Nov. 19, 2019 and Chinese Patent Application No. 201910579271.X, filed on Jun. 28, 2019. All of the aforementioned patent applications are hereby incorporated by reference in their entireties.

TECHNICAL FIELD

Embodiments of this application relate to the field of communication technologies, and in particular, to an application relocation method and apparatus.

BACKGROUND

As a large quantity of various cloud computing resources are deployed in networks, a same application is usually deployed in a plurality of edge data networks at the same time, and the same application in the plurality of edge data networks can provide a same service, and have a functional equivalence. After accessing a network, a terminal selects a nearby application instance in an edge data network to provide a service. The application instance is referred to as a source application instance. Due to mobility of the terminal, the terminal may be increasingly farther away from the source application instance, and the source application instance cannot well continue to provide the service for the terminal. In the network, a new nearby application instance in an edge data network is reselected for the terminal to continue to provide a service, to meet a service continuity requirement of the application. The new application instance is referred to as a target application instance.

Because the source application instance and the target application instance belong to different edge data networks, the source application instance and the target application instance cannot directly communicate with each other, and consequently service continuity cannot be maintained. An application client that is communicating with a to-be-relocated application can be used to perform communication and context transfer. The application client may obtain and cache a context of the application of the terminal from the source application instance, and send the cached context of the application of the terminal to the target application instance after establishing a communication connection to the target application instance.

However, in this manner of transferring the context of the application through a third party, services are delayed or even interrupted, and consequently requirements of some applications that have relatively high service continuity requirements cannot be met.

SUMMARY

Embodiments of this application provide an application relocation method and apparatus, to resolve a problem that a service delay is caused by application context relocation, and consequently a requirement of an application that has a relatively high service continuity requirement cannot be met.

According to a first aspect, an application relocation method is provided. The method is executed by an edge enabler server (EES), and the EES may be denoted as a source EES. The method is implemented in the following steps: The source edge enabler server EES sends a first message to a target EES, where the first message is used to request to relocate an application of a terminal apparatus, and the first message includes an identifier of the terminal apparatus and an identifier of the application. The source EES receives a second message from the target EES, where the second message is a response message of the first message, and the second message is used to indicate whether relocation of the application of the terminal apparatus is allowed. Compared with relocating an application through a third party, in this application, an application relocation delay can be reduced through interaction between the source EES and the target EES, and for an application that needs to maintain service continuity, application relocation efficiency can be improved. For example, in multi-access edge computing (MEC) scenario, during relocation of the application that is triggered by movement of the terminal apparatus, synchronous relocation of the application of the terminal apparatus can be implemented between an application instance of the source EES and an application instance of the target EES.

In a possible design, the source EES receives an acknowledgment (ACK) response message of the first message from the target EES. A delay for feeding back the ACK message is relatively low, and this can help the source EES continue to perform another operation, such as triggering a source application instance to freeze a context of the application of the terminal apparatus, starting context transfer, or forwarding user plane data, so that relocation of the application can be accelerated, and a relocation delay can be reduced.

In a possible design, the source EES determines whether to relocate the application of the terminal apparatus based on at least one of the following information: user plane path change information of the terminal apparatus, relocation capability information of the application of the terminal apparatus, relocation requirement information of the application of the terminal apparatus, or information about whether the target EES supports relocation of the application of the terminal apparatus. In this way, the source EES can more accurately determine specific applications in one or more applications of the terminal apparatus need to be relocated, determine whether the applications can be relocated, and determine a specific target application instance to which the applications are relocated.

In a possible design, the source EES determines to relocate the application of the terminal apparatus in at least one of the following manners: when a user plane path of the terminal apparatus changes, the source EES determines to relocate the application of the terminal apparatus; or when the relocation capability information of the application of the terminal apparatus indicates that relocation is supported, the source EES determines to relocate the application of the terminal apparatus; or when the relocation requirement information of the application of the terminal apparatus indicates that the application of the terminal apparatus needs to be relocated, the source EES determines to relocate the application of the terminal apparatus; or when determining, based on the information about whether the target EES supports relocation of the application of the terminal, that the target EES supports relocation of the application of the terminal, the source EES determines to relocate the application of the terminal apparatus. In this way, the source EES can more accurately determine specific applications in one or more applications of the terminal apparatus need to be relocated, determine whether the applications can be relocated, and determine a specific target application instance to which the applications are relocated, thereby implementing user equipment (UE) application service continuity.

In a possible design, the source EES obtains the relocation capability information of the application of the terminal apparatus and the relocation requirement information of the application of the terminal apparatus from a source application instance, where the source application instance is an application instance that is of the application and that is associated with the source EES. In this way, the source EES may determine, with reference to the relocation capability information of the application and the relocation requirement information of the application, whether to relocate the application.

In a possible design, the source EES receives a third message from a source application instance, where the third message is used to request to relocate the application of the terminal apparatus, and the source application instance is an application instance that is of the application and that is associated with the source EES. In this way, the source EES can determine, based on the third message, the application that has a relocation requirement.

In a possible design, the source EES sends a response message of the third message to the source application instance.

In a possible design, the source EES sends a notification message to the source application instance, where the notification message is used to notify the source application instance that a user plane path of the terminal apparatus changes. In this way, the source application instance can be allowed to determine whether to relocate the application.

In a possible design, the source EES receives a fourth message from the target EES, where the fourth message includes information about at least one application instance on the target EES; and the source EES determines, based on the fourth message, whether the at least one application instance includes an application instance of the application of the terminal apparatus. In this way, the source EES can obtain a capability of the target EES, to determine, based on the capability of the target EES, whether to initiate relocation of the application or whether to accept relocation of the application that is initiated by the application instance.

In a possible design, the source EES sends a request message to the target EES, where the request message includes the identifier of the application; and the source EES receives a response message of the request message from the target EES, where the response message of the request message is used to indicate whether an application instance of the application exists on the target EES. In this way, the source EES can obtain a capability of the target EES, to determine, based on the capability of the target EES, whether to initiate relocation of the application or whether to accept relocation of the application that is initiated by the application instance.

In a possible design, the source EES obtains, based on the user plane path change information of the terminal apparatus, a data network access identifier (DNAI) after the user plane path changes; and the source EES determines information about the target EES to which the DNAI belongs. In this way, the source EES can determine a specific target EES to which relocation of the application needs to be initiated.

In a possible design, the source EES determines, based on a stored correspondence between a DNAI and an EES, information about the target EES corresponding to the DNAI; or the source EES sends a query request to a network management system, and receives, from the network management system, information about the target EES corresponding to the DNAI. In this way, the source EES can determine a specific target EES to which relocation of the application needs to be initiated.

In a possible design, the first message further includes information about a core network element communicating with the application.

In a possible design, when the second message is used to indicate that relocation of the application is allowed, the second message includes at least one of the following: the identifier of the terminal apparatus, the identifier of the application, an address of a target application instance, or a port number used for relocation of the application, where the target application instance is an application instance that is of the application and that is associated with the target EES.

In a possible design, the source EES sends a fifth message to the source application instance, where the fifth message is used to request to relocate the application of the terminal apparatus, and the source application instance is the application instance that is of the application and that is associated with the source EES. In this way, the source application instance can be notified to relocate the application.

In a possible design, the source EES receives a response message of the fourth message from the source application instance.

In a possible design, the source EES sends a context of the application of the terminal apparatus to the target EES.

In a possible design, the source EES receives the context of the application of the terminal apparatus from the source application instance.

In a possible design, after the context of the application of the terminal apparatus is transmitted, the source EES sends a downlink packet end indication to a user plane network element, and sends an uplink packet end indication to the target EES.

According to a second aspect, an application relocation method is provided. The method is executed by an edge enabler server EES, and the EES may be denoted as a target EES. The method is implemented in the following steps: The target edge enabler server EES receives a first message from a source EES, where the first message is used to request to relocate an application of a terminal apparatus, and the first message includes an identifier of the terminal apparatus and an identifier of the application. The target EES sends a second message to the source EES, where the second message is a response message of the first message, and the second message is used to indicate whether relocation of the application of the terminal apparatus is allowed. Compared with relocating an application through a third party, in this application, an application relocation delay can be reduced through interaction between the source EES and the target EES, and for an application that needs to maintain service continuity, application relocation efficiency can be improved. For example, in an MEC scenario, during relocation of the application that is triggered by movement of the terminal apparatus, synchronous relocation of the application of the terminal apparatus can be implemented between an application instance of the source EES and an application instance of the target EES.

In a possible design, the target EES sends an acknowledgment (ACK) response message of the first message to the source EES. A delay for feeding back the ACK message is relatively low, and this can help the source EES continue to perform another operation, such as triggering a source application instance to freeze a context of the application of the terminal apparatus, starting context transfer, or forwarding user plane data, so that relocation of the application can be accelerated, and a relocation delay can be reduced.

In a possible design, the target EES sends a third message to a target application instance, where the third message is used to request to relocate the application of the terminal apparatus, the target application instance is an application instance that is of the application and that is associated with the target EES, and the third message includes the identifier of the terminal apparatus.

In a possible design, the third message includes an internet protocol (IP) address of a source application instance, and the source application instance is an application instance that is of the application and that is associated with the source EES.

In a possible design, the target EES receives a response message of the third message from the target application instance.

In a possible design, the response message of the third message includes a port number used for relocation of the application. In this way, messages used for relocation of the application can be distinguished.

In a possible design, the target EES receives, from the target application instance, the port number used for relocation of the application, or the target EES allocates the port number used for relocation of the application.

In a possible design, the target EES determines, based on the first message, whether relocation of the application of the terminal apparatus is allowed; and that the target EES sends a second message to the source EES includes: when determining that relocation of the application of the terminal apparatus is allowed, the target EES sends, to the source EES, the second message used to indicate that relocation of the application of the terminal apparatus is allowed.

In a possible design, when the second message is used to indicate that relocation of the application of the terminal apparatus is allowed, the second message includes at least one of the following information: the identifier of the terminal apparatus, the identifier of the application, an address of the target application instance, or the port number used for relocation of the application, where the target application instance is the application instance that is of the application and that is associated with the target EES.

In a possible design, the first message further includes information about a core network element communicating with the terminal apparatus.

According to a third aspect, an application relocation method is provided. The method is implemented in the following manner: A terminal apparatus receives an IP address of a target application instance; and the terminal apparatus adds a transmission connection by using the IP address, where the transmission connection is used to transmit data of an application of the terminal apparatus, and the target application instance is an instance of the application.

In a possible design, the terminal apparatus receives the IP address of the target application instance from a source application instance or a source edge enabler platform.

According to a fourth aspect, an application relocation apparatus is provided. The apparatus has a function of implementing any one of the first aspect and the possible designs of the first aspect. The function may be implemented by hardware, or may be implemented by hardware executing corresponding software. The hardware or the software includes one or more modules corresponding to the foregoing function.

In a possible design, the apparatus may be a chip or an integrated circuit.

In a possible design, the apparatus includes a transceiver and a processor. The transceiver is configured to communicate with another communication device. The processor is configured to couple with a memory, and execute a program stored in the memory. When the program is executed, the apparatus can perform the method according to any one of the first aspect and the possible designs of the first aspect.

In a possible design, the apparatus further includes the memory, and the memory is configured to store the program executed by the processor.

In a possible design, the apparatus is an edge enabler server EES.

According to a fifth aspect, an application relocation apparatus is provided. The apparatus has a function of implementing any one of the second aspect and the possible designs of the second aspect. The function may be implemented by hardware, or may be implemented by hardware executing corresponding software. The hardware or the software includes one or more modules corresponding to the foregoing function.

In a possible design, the apparatus may be a chip or an integrated circuit.

In a possible design, the apparatus includes a transceiver and a processor. The transceiver is configured to communicate with another communication device. The processor is configured to couple with a memory, and execute a program stored in the memory. When the program is executed, the apparatus can perform the method according to any one of the second aspect and the possible designs of the second aspect.

In a possible design, the apparatus further includes the memory, and the memory is configured to store the program executed by the processor.

In a possible design, the apparatus is an edge enabler server EES.

According to a sixth aspect, an apparatus is provided. The apparatus has a function of implementing any one of the third aspect and the possible designs of the third aspect. The function may be implemented by hardware, or may be implemented by hardware executing corresponding software. The hardware or the software includes one or more modules corresponding to the foregoing function.

In a possible design, the apparatus may be a chip or an integrated circuit.

In a possible design, the apparatus includes a transceiver and a processor. The transceiver is configured to communicate with another communication device. The processor is configured to couple with a memory, and execute a program stored in the memory. When the program is executed, the apparatus can perform the method according to any one of the third aspect and the possible designs of the third aspect.

In a possible design, the apparatus further includes the memory, and the memory is configured to store the program executed by the processor.

In a possible design, the apparatus is a terminal apparatus.

According to a seventh aspect, a chip is provided. The chip is connected to a memory or the chip includes the memory, and is configured to read and execute a software program stored in the memory, to implement the method according to any one of the first aspect to the third aspect and the possible designs of the first aspect to the third aspect.

According to an eighth aspect, a communication system is provided. The communication system includes a source EES and a target EES, the source EES is configured to perform the method according to any one of the first aspect and the possible designs of the first aspect, and/or the target EES is configured to perform the method according to any one of the second aspect and the possible designs of the second aspect.

In a possible design, the communication system further includes a terminal apparatus, and the terminal apparatus is configured to perform the method according to any one of the third aspect and the possible designs of the third aspect.

According to a ninth aspect, a computer-readable storage medium is provided. The computer-readable storage medium stores instructions; and when the instructions are run on a computer, the computer is enabled to perform the method according to any one of the foregoing aspects and the possible designs of the foregoing aspects.

According to a tenth aspect, a computer program product including instructions is provided. When the computer program product runs on a computer, the computer is enabled to perform the method according to any one of the foregoing aspects and the possible designs of the foregoing aspects.

DESCRIPTION OF EMBODIMENTS

Embodiments of this application provide an application relocation method and apparatus. Because a terminal apparatus moves, a specific application on the terminal apparatus needs to be relocated, to maintain service continuity of the application. In this application, information exchange between a source edge enabler server (S-EES) and a target edge enabler server (T-EES) can help reduce a service delay caused by relocation of the application on the terminal. The S-EES may be denoted as a source EES, and the T-EES may be denoted as a target EES. The method and the apparatus are based on a same inventive concept. Because a problem-resolving principle of the method is similar to a problem-resolving principle of the apparatus, mutual reference may be made between an implementation of the apparatus and an implementation of the method, and no repeated description is provided. In descriptions of embodiments of this application, the term "and/or" describes an association relationship between associated objects and represents that three relationships may exist. For example, A and/or B may represent the following three cases: Only A exists, both A and B exist, and only B exists. The character "/" usually represents an "or" relationship between the associated objects. In this application, "at least one" means one or more, and "a plurality of" means two or more. In addition, it should be understood that, in the descriptions of this application, terms such as "first" and "second" are merely used for distinguishing and description, but cannot be understood as indicating or implying relative importance, or indicating or implying an order.

The communication method provided in embodiments of this application may be applied to a 4th generation (4G) communication system, a 5th generation (5G) communication system, or various future communication systems.

The following describes in detail the embodiments of this application with reference to the accompanying drawings.

Figure 1:
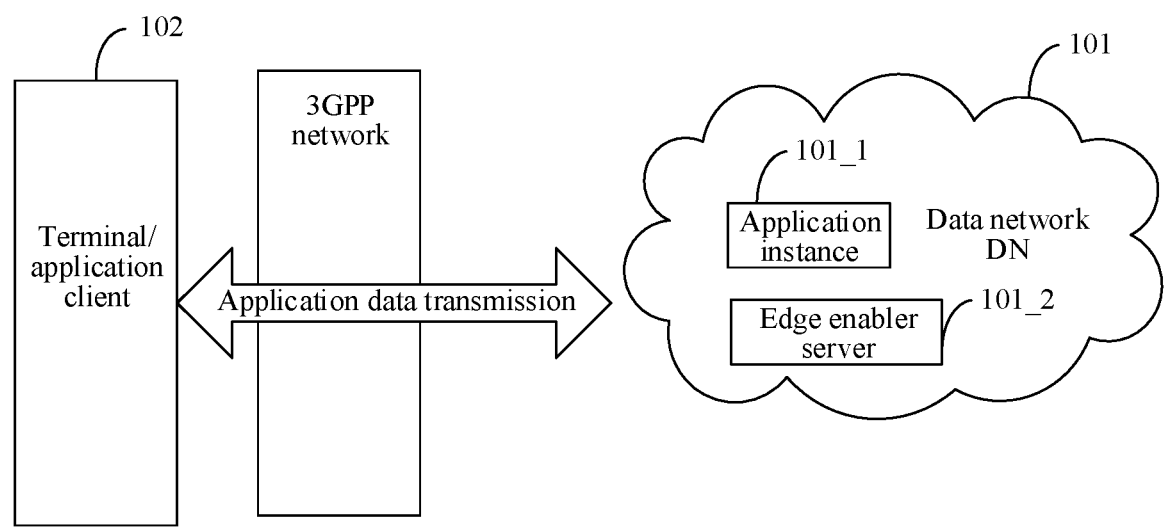
FIG. 1 is a schematic diagram of an architecture of a communication system according to an embodiment of this application.

FIG. 1 shows an architecture of a possible communication system to which an application relocation method according to an embodiment of this application is applicable. As shown in FIG. 1, a communication system 100 includes at least one data network (DN) 101 and a terminal apparatus 102. The DN may be an edge data network (EDN), and the EDN may include one or more local DNs. The DN 101 includes an application instance 101_1 and an EES 101_2. The terminal apparatus 102 may also be referred to as an application client. Some applications may run on the terminal apparatus 102, and the applications obtain application services by accessing the application instance 101_1 in the DN 101.

The EES 101_2 is configured to provide some support capabilities for the application instance 101_1 associated with the EES 101_2, to better support deployment of the applications in the DN 101. The application instance 101_1 associated with the EES 101_2 may include an application instance registered with the EES 101_2. The application instance is generally an application instance that has been instantiated but has not yet started to provide a service for a client. Or the application instance 101_1 associated with the EES 101_2 may include an application instance that is configured on the EES 101_2 by a management system. Generally, an installation package of the application instance has been configured on the EES 101_2, but the application instance has not yet been instantiated. Or the application instance 101_1 associated with the EES 101_2 may include an application instance that is running on the EES 101_2. Generally, the application instance already provides a service for a client. Or the application instance 101_1 associated with the EES 101_2 may include an application instance that has not yet been deployed but can be deployed on the EES. In the embodiments of this application, a name of the EES is an example, and the EES may have another name. This is not limited in the embodiments of this application. A device with another name that performs a same or similar function as the EES also falls within the protection scope of the embodiments of this application.

The terminal apparatus 102 may perform application data transmission with the DN 101 by using a 3GPP network.

The terminal apparatus 102 is also referred to as user equipment (UE), a mobile station (MS), a mobile terminal (MT), or the like, and is a device that provides voice or data connectivity for a user, or may be an internet of things device. For example, the terminal apparatus 102 includes a handheld device, a vehicle-mounted device, or the like that has a wireless connection function. Currently, the terminal apparatus 102 may be a mobile phone, a tablet computer, a notebook computer, a palmtop computer, a mobile internet device (MID), a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR)

device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. In addition, the terminal apparatus 102 may alternatively be a chip.

An application may be deployed in a plurality of edge data networks to provide undifferentiated services for clients. Due to a mobility feature of the terminal apparatus, a server side (namely, an application instance) that provides an application service for an application client on the terminal apparatus may be transferred from one edge data network to another edge data network. In this case, EESs and application instances in different edge data networks are relocated (where relocation may also be understood as handover). A case in which an application server that provides a service for an application on a terminal apparatus changes from one application instance to another application instance may be referred to as relocation of the application. In this application, relocation of the application may be further understood as relocation of a context of the application in an application relocation process. In other words, relocation of the application may be equivalently understood as relocation of the context of the application. In the described embodiment, relocation of the context may be used as an example to describe relocation of the application. A service continuity requirement of the application may be met through relocation. In this embodiment of this application, an edge data network in which the application of the terminal apparatus is originally located is referred to as a source edge data network, and a new edge data network to which the application of the terminal apparatus is handed over is referred to as a target edge data network. An application instance running the application in the source edge data network is referred to as a source application instance, and an EES associated with the source application instance is referred to as a source EES. Usually, an application instance runs on a virtual machine in a data center. The source application instance and the source edge enabler server may be located in a same physical equipment room, on a same physical device, or on different physical devices. Similarly, an application instance that can run the application in the target edge data network is referred to as a target application instance, and an EES associated with the target application instance is referred to as a target EES, or the target application instance is an application instance that receives (or accepts) the application that needs to be relocated. The target application instance and the target edge enabler server may be located in a same physical equipment room, on a same physical device, or on different physical devices.

In this embodiment of this application, the application instance is an application server that provides a service for an application user (user) who signs a service agreement with an application provider, and the application user logs in to an application client on the terminal apparatus, and communicates with the application instance through a connection between the application client and the application instance. An enabler client (for example, an edge enabler client (EEC), or an edge data network configuration client (EDN CC)) is a middleware layer, and is usually located in an operating system, or is located between the application client and the operating system. The application client may obtain an edge enablement service from the enabler client through an application programming interface (API).

When the terminal apparatus moves from the source edge data network to the target edge data network, a user plane path for accessing an application service is not optimal, resulting in a delay or interruption of an application service. To reduce the delay of the application service and ensure application service continuity, the application instance needs to be relocated. The relocation of the application instance may also be understood as transfer of the application instance or handover of the application instance. Therefore, the context of the application of the terminal apparatus needs to be synchronously relocated from the source application instance to the target application instance. Relocation of the context of the application of the terminal apparatus may be implemented with assistance of the source EES and the target EES.

Figure 2A:
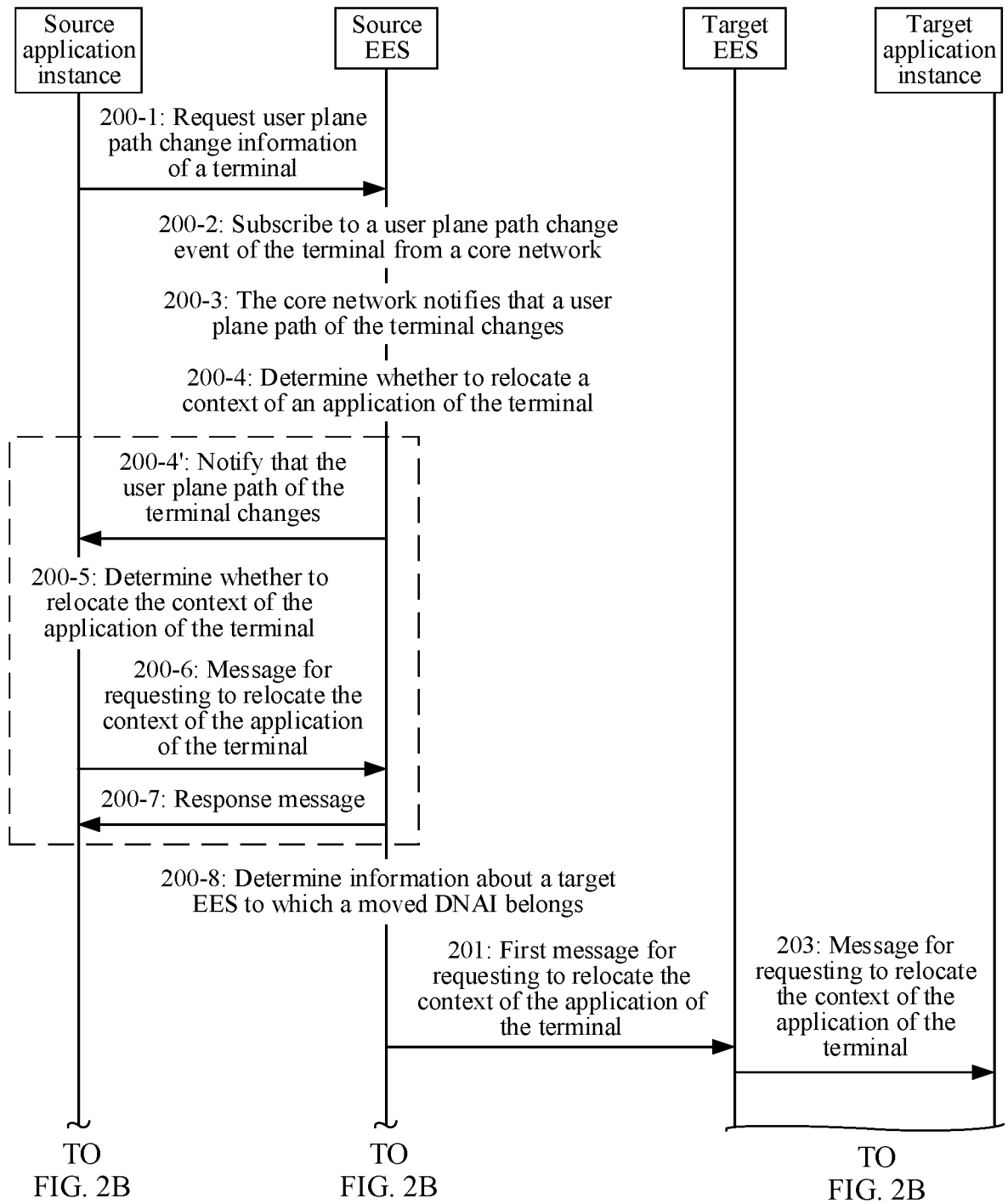
FIG. 2A and FIG. 2B are a first schematic flowchart of an application relocation method according to an embodiment of this application.
Figure 2B:
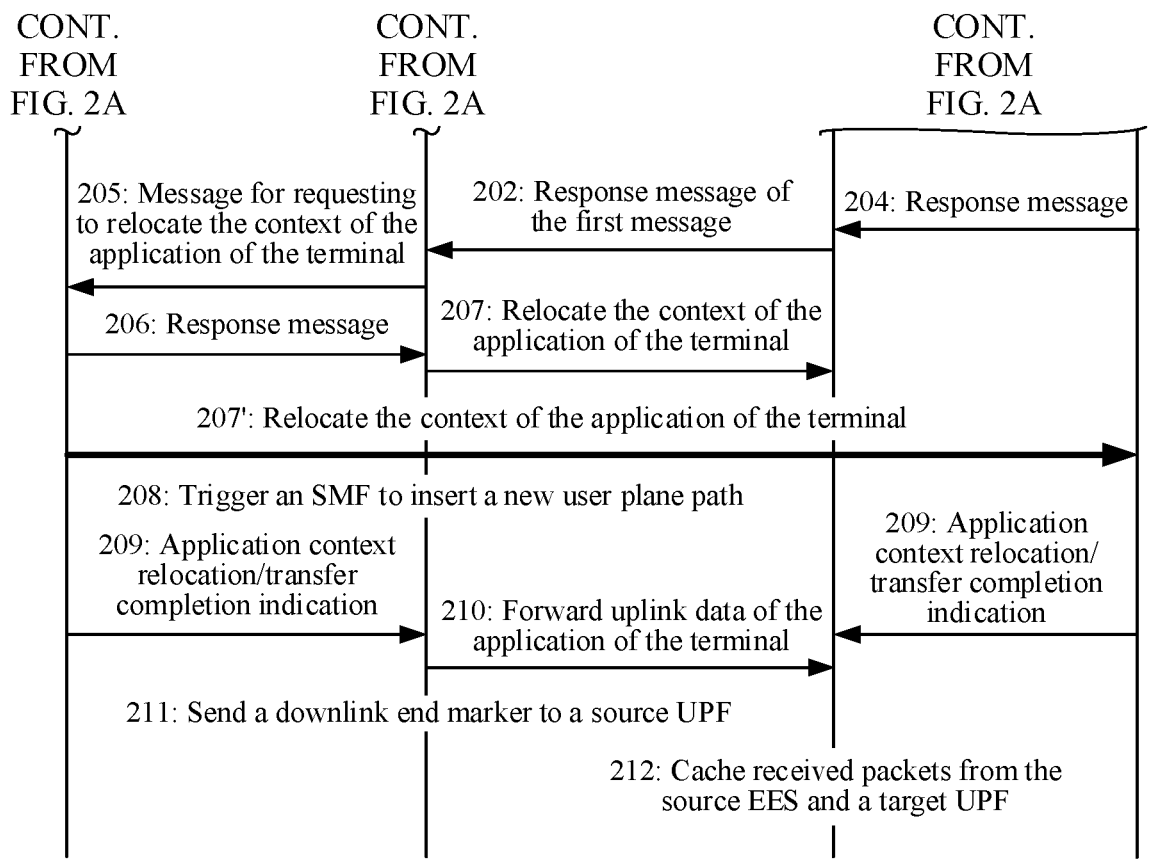

As shown in FIG. 2A and FIG. 2B, a specific procedure of an application relocation method provided in this application is described as follows.

S201: A source EES sends a first message to a target EES, and the target EES receives the first message from the source EES.

The first message is used to request to relocate an application of a terminal apparatus, that is, to request to hand over a server side from one application instance to another application instance, where an application client running on the terminal apparatus obtains an application service on the server side. This is also relocation of the application that is described above. Relocating the application of the terminal apparatus may be specifically understood as relocating a context of the application of the terminal apparatus, that is, relocating a context of an application client running on the terminal apparatus in a source application instance to a target application instance, to maintain application service continuity of the application client on the terminal apparatus. The "context" described in this application refers to "the context of the application of the terminal apparatus". The application of the terminal apparatus is an application that needs to be relocated on the terminal apparatus, and an identifier of the application or some other descriptions of the application described below indicate the application that needs to be relocated on the terminal. Related descriptions of an application returned by the target application instance or the target EES indicate an application that is allowed to be relocated. The context includes a context of an application layer, such as an identifier of an application layer session, application layer encryption and decryption key information, application layer security authorization and authentication information (for example, a token), and configuration information of an application user, and may further include a network context such as TCP connection information and socket information. Further, the context may include a cached packet. The first message is an example of a message name, and a specific name of the message is not limited in this application. For example, the first message may be referred to as an application relocation request or an application context relocation/transfer request. The first message may include an identifier of the terminal apparatus and an identifier of the application. The identifier of the terminal apparatus may be an ID or an IP address of the terminal apparatus, for example, a 3GPP identifier, a subscription permanent identifier (SUPI), or a generic public subscription identifier (GPSI) of the terminal apparatus, an identifier of the application client on the terminal apparatus, an identifier of an application layer of the application user on the terminal apparatus, a reference identifier allocated by the EES to the terminal apparatus (or the application client or the application user), or the IP address of the terminal apparatus such as an IPv4/v6 address of the terminal apparatus. The identifier of the application may be represented by using a domain name (fully qualified domain name, FQDN) of the application, the IP address of the application (an IP address of the source application instance) or an application identifier (ID), or a uniform resource locator (URL) of the application. The identifier of the application included in the first message may be the IP address of the application. In this case, the IP address of the application is a broad identifier, and may be any one of the foregoing examples. An application may have a plurality of application instances, and the plurality of application instances correspond to an identifier of a same application, for example, an FQDN, but the plurality of application instances may use different IP addresses. Therefore, the identifier of the application may alternatively be an IP address of the application instance or a URL of the application instance. In an implementation, the identifier of the application is an FQDN. In another implementation, the identifier of the application is an IP address or a URL of the source application instance and an FQDN.

The first message may further include the IP address of the source application instance, so that the target EES subsequently sends the IP address of the source application instance to the target application instance.

It should be noted that the first message may be used to request to relocate one or more applications of the terminal apparatus. If a plurality of applications are to be relocated, the first message carries identifiers of the plurality of applications. The first message may further include information about a core network element (CN info) that corresponds to the application of the terminal apparatus, namely, information that is about the core network element and that is used when the terminal apparatus performs application data transmission with a data network for the application. The core network element may include a session management function (SMF), a policy control function (PCF), a network exposure function (NEF), or the like. The information about the core network element may include information about the SMF (for example, an IP address of the SMF), information about the PCF (for example, an IP address of the PCF), or information about the NEF (for example, an IP address of the NEF).

Similarly, if the first message is used to request to relocate a plurality of applications of the terminal apparatus, the first message includes information about core network elements that corresponds to the plurality of applications of the terminal apparatus.

S202: The target EES sends a second message to the source EES, and the source EES receives the second message from the target EES.

The second message is a response message of the first message. The second message is used to indicate whether relocation of the application of the terminal apparatus is allowed, and also indicates whether relocation of the application of the terminal apparatus is accepted. Whether relocation of the application of the terminal apparatus is allowed may be specifically understood as whether relocation of the context of the application of the terminal apparatus is allowed, or whether relocation of the context of the application of the terminal apparatus is accepted. The target EES may determine, based on information about the application instance on the target EES or a load status, whether relocation of the application of the terminal apparatus is allowed. Similar to the first message, the second message is an example of a message name, and a specific name of the message is not limited in this application. For example, the second message may be referred to as an application relocation response or an application context relocation/transfer response.

The response message of the first message may be an acknowledgment (ACK) message or a reject (REJECT) message, the ACK message is used to indicate that relocation of the application of the terminal apparatus is allowed, and the REJECT message is used to indicate that relocation of the application of the terminal apparatus is not allowed. If the message is the ACK message, after sending the ACK message, the target EES sends a reply message to the source EES based on a result of interaction between the target EES and the source EES. After receiving the first message in S201, if the target EES acknowledges that relocation of the application of the terminal apparatus can be received, the target EES may immediately feed back an ACK message to the source EES. A delay for feeding back the ACK message is relatively low, and this can help the source EES continue to perform another operation, such as triggering the source application instance to freeze the context of the application of the terminal apparatus, starting context transfer, or forwarding user plane data, so that relocation of the application can be accelerated, and a relocation delay can be reduced.

The response message of the first message may alternatively be a reply message. Content of the reply message is the same as or similar to content of the reply message sent by the target EES to the source EES. If the target EES does not feed back the REJECT message to the source EES, the target EES may return the reply message to the source EES. The response message of the first message may include the identifier of the terminal apparatus and the identifier of the application. For functions and definitions of the identifier of the terminal apparatus and the identifier of the application, refer to related descriptions of the identifier of the terminal apparatus and the identifier of the application in S201. Details are not described herein again. The identifier of the terminal apparatus carried in the response message is the identifier of the terminal apparatus carried in the first message, and is used to indicate the same terminal apparatus.

If the first message requests to relocate the application of the terminal apparatus, the identifier of the application that is included in the response message of the first message may be the identifier of the application included in the first message, and is used to indicate the same application. In another implementation, the first message may alternatively not carry the identifier of the application, and indicates, by default, that the target EES allows relocation of the application of the terminal apparatus.

If the first message requests to relocate contexts of a plurality of applications of the terminal apparatus, the target EES may allow relocation of a part of or all of the plurality of applications. If the target EES allows relocation of the part of the plurality of applications, in an implementation, the response message of the first message indicates success/acceptance, and identifiers of the applications that are included in the response message of the first message are identifiers of applications whose relocation is allowed (or accepted) by the target EES, and are a subset of the identifiers of the applications included in the first message. For example, the subset is represented as accepted S_APP FQDN(s). In another implementation, the first message indicates failure/rejection, and the first message may include an identifier of an application whose relocation is allowed (or accepted) by the target EES and/or an identifier of an application whose relocation is not allowed (or is rejected) by the target EES. In this way, after receiving the response, the source EES may carry the identifier of the application whose relocation is allowed (or accepted) by the target EES, to initiate an application relocation request again.

If the target EES allows relocation of all of the plurality of applications, the identifiers of the applications that are included in the response message of the first message may be the identifiers of the applications included in the first message, and are used to indicate that relocation of the contexts of all the applications is allowed. In another implementation, the first message may alternatively not carry the identifiers of the applications, and indicates, by default, that the target EES allows relocation of all of the plurality of applications.

The target EES selects the target application instance. The second message may further carry an address (T_APP IP addr) of the target application instance selected by the target EES and/or a port number used for relocation of the application. The port number used for relocation of the application may be from the target application instance, or may be allocated by the target EES. That is, the target application instance sends, to the target EES, the port number used for relocation of the application, and the target EES receives the port number from the target application instance. Alternatively, the target EES allocates the port number used for relocation of the application. For example, if the target EES does not receive the port number that is used for relocation of the application and that is sent by the target application instance, the target EES allocates the port number used for relocation of the application.

The address (T_APP IP addr) of the target application instance indicates the IP address of the target application instance that can run the application on the target EES. The target application instance and the source application instance are application instances of the same application. Different IP addresses may be applied to a same application in different data networks, and the address (T_APP IP addr) of the target application instance or the port number used for relocation of the application can help the terminal apparatus initiate a transmission connection to the target application instance, for example, establish a transmission control protocol (TCP) subflow to the target application instance. The target EES determines the target application instance used to accept relocation of the application, and the target application instance is an application instance managed by the target EES. For example, the target EES may select, based on a load status, an application instance with minimum load as the target application instance. For another example, the target EES sends a request to one or more application instances that are allowed to accept the application, to request the application instance to accept relocation of the application, and the target EES selects an application instance that is of the application and that first responds to accept relocation of the application as the target application instance. The target EES uses the application instance that accepts relocation of the application as the target application instance, and includes an address of the application instance in the second message.

Similarly, if a first request is used to request to relocate an application of the terminal apparatus, the second message only needs to carry an address of a target application instance and/or a port number used for relocation of the application. If the first request is used to request to relocate a plurality of applications of the terminal apparatus, the target EES needs to determine specific applications that are allowed to be relocated, and includes, in the second message, addresses of target application instances of the applications that are allowed to be relocated and/or port numbers that are of the applications allowed to be relocated and that are used for relocation of the applications.

Based on the foregoing descriptions, supplementary descriptions of optional implementations of the application relocation method in this embodiment of this application are provided below.

Before S201, the following steps may be further performed.

S200-1: The source application instance requests user plane (UP) path change information of the terminal apparatus from the source EES, and the source EES receives the request from the source application instance.

For example, the source application instance may subscribe to a user plane path change event of the terminal apparatus from the source EES. The request carries the identifier of the terminal apparatus. The identifier of the terminal apparatus may be an external identifier (for example, a GPSI) of the terminal apparatus, an IP address of the terminal apparatus, or the identifier of the application.

S200-2: The source EES subscribes to the UP path change information of the terminal apparatus from a 3GPP core network, and the 3GPP core network receives a request of the subscription from the source EES.

The subscription may be performed through the NEF. For different application instances, the terminal apparatus may subscribe to UP path change information of the same terminal apparatus from the source EES, that is, it may be understood that the source EES may receive subscription of a plurality of application instances to UP path change of the same terminal apparatus. The source EES aggregates requests for the UP path change subscribed by the plurality of application instances. The source EES subscribes to the 3GPP core network (for example, the SMF) once based on the aggregated requests.

S200-3: The 3GPP core network sends a notification message to the source EES to notify the UP path change information of the terminal apparatus, and the source EES receives the notification message from the 3GPP core network.

Because the terminal apparatus moves, a data network access identifier (DNAI) of the terminal apparatus changes, and the 3GPP core network sends the notification message to the source EES to notify that the DNAI of the terminal apparatus changes, and provide the DNAI, the IP address or an IP prefix of the terminal apparatus, and N6 traffic routing information (for example, N6 tunnel information) in the notification message.

In this application, after receiving the UP path change information of the terminal apparatus, the source EES may trigger relocation of the context of the application in two manners.

Manner 1:

S200-4: The source EES determines whether to relocate the application of the terminal apparatus.

Specifically, the source EES may determine whether to relocate the application of the terminal apparatus based on at least one of the following: the user plane path change information of the terminal apparatus, relocation capability information of the application, relocation requirement information of the application, or capability information about whether the target EES supports relocation of the application. Names of these types of information are only examples and are used to describe attributes or functions of the information. These names cannot be used to limit the information and can be replaced with other names.

When the source EES determines, based on change of a user plane path of the terminal apparatus, whether to relocate the application of the terminal apparatus, the source EES determines, based on the notification message received in S200-3, to relocate the application of the terminal apparatus when the notification message indicates that the user plane path of the terminal apparatus changes. When the notification message indicates that the user plane path of the terminal apparatus does not change, the source EES may determine not to relocate the application of the terminal apparatus.

A relocation capability of the application includes whether relocation of the application is supported. When the source EES determines, based on the relocation capability information of the application, whether to relocate the application of the terminal apparatus, if relocation of the application is supported, the source EES determines to relocate the application of the terminal apparatus; or if relocation of the application is not supported, the source EES determines not to relocate the application of the terminal apparatus.

Because some applications of the terminal apparatus may or may not have a relocation requirement, the source EES obtains the relocation requirement of the application. When the source EES determines, based on the relocation requirement of the application, whether to relocate the application of the terminal apparatus, if the relocation requirement information of the application indicates that the application needs to be relocated, the source EES determines to relocate the application of the terminal apparatus; otherwise, the source EES determines not to relocate the application of the terminal apparatus.

Optionally, the source EES may obtain the relocation capability information of the application and/or the relocation requirement information of the application from the source application instance. For example, the source EES may obtain the information from registration information of the source application instance. A possible implementation procedure is described as follows. (1) The source application instance obtains an IP address of the source EES. Generally, the IP address of the source EES is statically configured for the source application instance. Alternatively, an FQDN may be configured on the source application instance, and the IP address of the source EES is obtained through domain name system (DNS) resolution. (2) The source application instance registers with the source EES, and sends a registration request, where the registration request carries at least one of the following information: an identifier of the application instance (AS ID/AS IP/FQDN), an authentication credential, service descriptions of the application instance, for example, a supported protocol type, a mobility capability of the application, where the mobility capability may be an indication of whether application mobility is supported, a mobility requirement of the application, where the mobility requirement indicates whether the application requires an edge enabler server to assist in relocation of the application, or an authentication credential of the application. (3) The source EES records information about the source application instance based on the registration request, performs authorization and authentication if necessary, and returns a registration response message to the source application instance.

Alternatively, the source EES may obtain the information by using capability or service publishing information of the source application instance, or the source EES may obtain the information through an edge network configuration server, or obtain the information in another manner. For example, the source EES obtains the information from exchanged information in a relocation process of another application.

When the source EES determines, based on whether the target EES supports relocation of the application, whether to relocate the application of the terminal apparatus, if the information about whether the target EES supports relocation of the application indicates that an application instance of the application exists on the target EES, the source EES determines to relocate the application of the terminal apparatus; otherwise, the source EES determines not to relocate the application of the terminal apparatus.

The source EES needs to obtain capability information about whether the target EES supports relocation of the application. Whether the target EES supports relocation of the application of the terminal apparatus depends on whether the application instance of the application exists or is allowed to run on the target EES. Therefore, the source EES needs to determine whether the application instance of the application exists or is allowed to run on the target EES.

Optionally, the source EES may send a request message to the target EES, where the request message carries the identifier of the application, and is used to request to query whether the application instance of the application exists or is allowed to run on the target EES. The target EES receives the request message from the source EES, determines, based on the identifier of the application, whether the application instance of the application locally exists or is allowed to run, and returns a response message of the request message to the source EES. The response message is used to indicate whether the application instance of the application exists or is allowed to run on the target EES. Alternatively, the response message of the request message is fed back to the source EES only when the application instance of the application locally exists, to indicate that the application instance of the application exists. If the response message indicates that the application instance of the application exists or is allowed to run on the target EES, the source EES may determine that the target EES supports relocation of the application of the terminal apparatus; otherwise, the source EES may determine that the target EES does not support relocation of the application of the terminal apparatus.

In another optional manner, the source EES may send an application instance subscription request to the target EES, to subscribe to information about the application instance on the target EES. The target EES returns an acknowledgement ACK message to the source EES. Alternatively, the target EES may directly notify the source EES of the information about the application instance on the target EES.

No matter whether the source EES subscribes to the information about the application instance on the target EES or the target EES actively notifies the information about the application instance, the target EES needs to send a message to the source EES to notify the information about the application instance on the target EES. Specifically, when the application instance on the target EES changes, the target EES sends the message to the source EES to notify the information about the application instance on the target EES. Alternatively, the target EES periodically sends the message to the source EES to notify the information about the application instance on the target EES. The message includes the information about the application instance on the target EES, for example, may include information about all application instances on the target EES, or information about one or more application instances, for example, may only include information about an application instance which has changed compared with that is notified last time.

After receiving the message from the target EES, the source EES determines, based on the information about one or more application instances included in the message, whether the application instances include the application instance of the application. If the application instances include the application instance of the application, the source EES may determine that the target EES supports relocation of the application of the terminal apparatus; otherwise, the source EES may determine that the target EES does not support relocation of the application of the terminal apparatus.

A method for obtaining the information about the application instance on the target EES by the source EES is applicable to any EES, and any EES may obtain information about an application instance on a neighboring EES by using the foregoing method.

The foregoing several manners in which the source EES determines whether to relocate the application of the terminal apparatus may be used independently, or may be used in combination with each other.

In Manner 1, the source EES determines to trigger a request to relocate the application of the terminal apparatus. In this manner, the source EES may determine to trigger a request to relocate a plurality of applications of the terminal apparatus. In Manner 2, the source EES triggers, by using the source application instance, a request to relocate the application of the terminal apparatus.

Manner 2:

S200-4': The source EES sends a notification message to the source application instance, to notify the UP path change information of the terminal apparatus, and the source application instance receives the notification message from the source EES.

The source EES receives the notification message sent by the 3GPP core network in S200-3, learns of the UP path change information of the terminal apparatus, and notifies the source application instance of the information.

S200-5: The source application instance determines whether to relocate the application of the terminal apparatus.

Specifically, for a method for determining, by the source application instance, whether to relocate the application of the terminal apparatus, refer to the method for determining, by the source EES, whether to relocate the application of the terminal apparatus in S200-4. For details, refer to related descriptions. Details are not described herein again. For example, the source application instance may determine whether to relocate the application of the terminal apparatus based on at least one of the following: the user plane path change information of the terminal apparatus, the relocation capability information of the application, or the relocation requirement information of the application. Names of these types of information are only examples and are used to describe attributes or functions of the information. These names cannot be used to limit the information and can be replaced with other names.

S200-6: The source application instance sends a message to the source EES, to request to relocate the application of the terminal apparatus. The source EES receives the message from the source application instance.

The message may be referred to as an application relocation request or an application context relocation/transfer request. The message includes the identifier of the terminal apparatus and the identifier of the application. For examples or definitions of these identifiers, refer to the foregoing descriptions of the related identifiers.

S200-7: The source EES returns a response message to the source application instance, and the source application instance receives the response message from the source EES.

The response message may be referred to as an application relocation response or an application context relocation/transfer response. The response message is used to acknowledge receiving of the relocation request. The source EES may acknowledge, by using the method described in S200-4, relocation of the application of the terminal apparatus, and return the response message to the source application instance.

After triggering the request to relocate the application of the terminal apparatus in Manner 1 or Manner 2, the source EES may further perform S200-8 before performing S202.

S200-8: The source EES obtains, based on the user plane path change information of the terminal apparatus, a DNAI after the user plane path changes, and determines information about a target EES to which the DNAI belongs.

The information about the target EES herein may be an address of the target EES, for example, an IPv4/v6 address, or an FQDN. Optionally, the information about the target EES may further include information about an application instance on the target EES, and include information about a registered/configured application instance.

A correspondence between a DNAI and an EES may be preconfigured by the source EES. For example, a correspondence table may be used to represent a DNAI corresponding to each EES. The source EES may determine, based on the preconfigured correspondence between the DNAI and the EES, an EES to which the DNAI after user plane path changes belongs, namely, the target EES. To reduce a quantity of entries of preconfigured correspondences between DNAIs and EESs, only correspondences between neighboring DNAIs and target EESs corresponding to the neighboring DNAIs may be configured. When these correspondences change, the source EES may update the correspondence table. Alternatively, the source S_EES may dynamically obtain, from a network management system, information about the target EES corresponding to the DNAI. The source EES sends a query request to the network management system, and receives, from the network management system, the information about the target EES corresponding to the DNAI after the user plane path changes. Alternatively, the source S-EES may discover/obtain the information about the target EES from the edge network configuration server.

In a possible implementation, after S201 and before S202, the following steps may be further included.

S203: The target EES sends a message to the target application instance, to request to relocate the application of the terminal apparatus. The target application instance receives the message from the target EES.

The message may be referred to as an application relocation request or an application context relocation/transfer request. The message includes the identifier of the terminal apparatus, and may further include the information about the core network element connected to the application of the terminal apparatus. For descriptions of parameters carried in the message, refer to the foregoing descriptions of the related parameters.

The target EES selects the target application instance, and sends the message to the target application instance, to request to relocate the application. The target application instance is an application instance that is of the application and that is selected by the target EES.

In a possible case, the target EES may not yet have the target application instance. In this case, the target EES may be first connected to the server, download the application instance, and trigger instantiation of the target application instance.

If the target application instance exists on the target EES, S203 may be directly performed. If the target application instance exists, it indicates that a port number of the server has been configured, and the application instance can be run as an account is logged in.

If a plurality of application instances of the application exist on the target EES, the target EES may select one of the plurality of application instances as the target application instance. For example, the target EES may select, based on a load status, an application instance with minimum load as the target application instance. For another example, the target EES sends a request to one or more application instances that are allowed to accept the application, to request the application instance to accept relocation of the application, and selects an application instance that first responds to accept relocation of the application as the target application instance.

S204: The target application instance returns a response message to the target EES, where the response message is used to respond to the message received in S203. The target EES receives the response message from the target application instance.

The response message may be referred to as an application relocation response or an application context relocation/transfer response. The response message carries the identifier of the terminal apparatus. For an explanation of the identifier, refer to the foregoing explanation of the identifier of the terminal apparatus.

Optionally, after receiving the message sent in S203, the target application instance may further allocate a port number for relocation of the application of the terminal apparatus, to relocate the application of the terminal apparatus. Specifically, it may be understood that the port number is used to receive a context that is of the application of the terminal apparatus and that needs to be relocated. The port number may be carried in the response message.

After S202, the following steps may be further included.

S205: The source EES sends a message to the source application instance, to request to relocate the application of the terminal apparatus. The source application instance receives the message from the source EES.

The message may be referred to as an application relocation request or an application context relocation/transfer request. The message includes the identifier (for example, a UE ID/IP) of the terminal apparatus and an identifier (for example, T_APP IP addr) of the target application instance, and may further include information about a port (port number) used for relocation of the application.

The address (T_APP IP addr) of the target application instance indicates the IP address of the target application instance that can run the application on the target EES. The target application instance and the source application instance are application instances of the same application. Different IP addresses may be applied to a same application in different data networks, and the address (T_APP IP addr) of the target application instance or the port number used for relocation of the application can help the terminal apparatus initiate a transmission connection to the target application instance, for example, establish a TCP subflow to the target application instance.

S206: The source application instance returns a response message of the message received in S205 to the source EES, and the source EES receives the response message from the source application instance.

The response message may be referred to as an application relocation response or an application context relocation/transfer response. The response message carries the identifier of the terminal apparatus. For an explanation of the identifier, refer to the foregoing explanation of the identifier of the terminal apparatus.

At this point, the procedure for requesting relocation of the application is completed. The source EES or the source application instance may perform an application context relocation process based on the foregoing process.

The context of the application may be relocated between the source EES and the target EES, for example, as shown in S207, or may be relocated between the source application instance and the target application instance, for example, as shown in S207'.

The source EES may indicate, in the first message, specific instances or network elements between which the context of the application is relocated, or may indicate, to the source application instance in another message, to relocate the context of the application to the target application instance.

S207: The source EES relocates (transfer) the context of the application of the terminal apparatus to the target EES, and the target EES receives the context that is of the application of the terminal apparatus and that is sent by the source EES.

The source EES and the target EES may perform context transmission based on a port that is used for relocation of the application and that is indicated in the second message.

S207': The source application instance relocates the context of the application of the terminal apparatus to the target application instance, and the target application instance receives the context that is of the application of the terminal apparatus and that is sent by the source application instance.

The source application instance and the target application instance may perform context transmission based on the port that is used for relocation of the application and that is allocated by the target application instance in S204.

Optionally, the source application instance may transmit the context of the application of the terminal apparatus to the target EES through the source EES, and the target EES transfers the received context of the application of the terminal apparatus to the target application instance.

S208: The source EES triggers the SMF to insert a new user plane UP path for the application of the terminal apparatus, and insert an uplink classifier (UL CL) or a branch point (BP).

Alternatively, this step may be performed by the target EES, and the target EES may perform this step after S202.

S209: After relocation of the context of the application of the terminal apparatus is completed, the source application instance and the target application instance each send an application context relocation/transfer completion indication to the source EES and the target EES.

This indication may be a message or is to call to an API provided by an EES.

S210: The source EES forwards uplink data and an end marker of the application of the terminal apparatus to the target EES.

This step may be performed after the target EES feeds back the ACK message for the first message to the source EES.

S211: The source EES sends a downlink end marker to a source user plane network element (user plane function, UPF).

This step may be performed synchronously with S210, and may be performed after the target EES feeds back the ACK message for the first message to the source EES.

S212: The target EES caches received packets from the source EES and a target UPF.

After a downlink packet of the target application instance or the application relocation/transfer completion indication is received, the packet from the source EES is first forwarded, and then the packet from the target UPF is forwarded.

Figure 3:
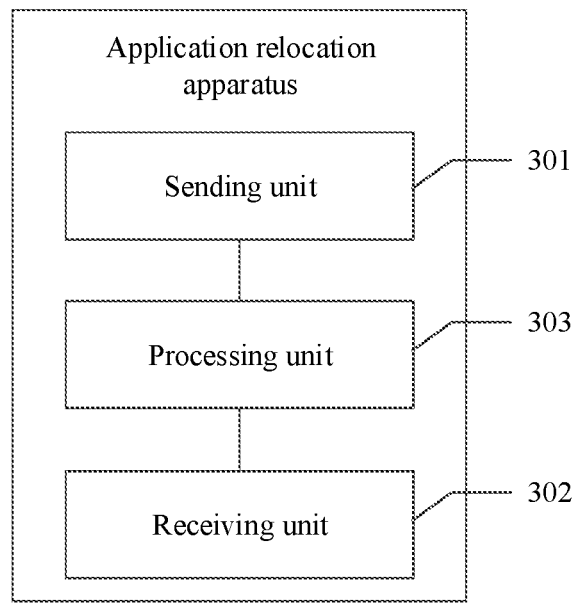
FIG. 3 is a first schematic diagram of a structure of an application relocation apparatus according to an embodiment of this application.

Based on a same technical concept as that in the foregoing method embodiment, as shown in FIG. 3, an embodiment of this application further provides an application relocation apparatus 300. The application relocation apparatus 300 is configured to perform operations performed by the source EES, the target EES, or the terminal apparatus in the foregoing method embodiment. The application relocation apparatus 300 includes a sending unit 301, a receiving unit 302, and a processing unit 303. The processing unit 303 is configured to invoke the sending unit 301 to send a signal or data to another communication apparatus, is configured to invoke the receiving unit 302 to receive a signal or data from the another communication apparatus, and is configured to perform another operation other than sending and receiving.

When the application relocation apparatus 300 is configured to perform an operation performed by a source EES, the sending unit 301 is configured to send a first message to a target EES, where the first message is used to request to relocate an application of a terminal apparatus, and the first message includes an identifier of the terminal apparatus and an identifier of the application; and the receiving unit 302 is configured to receive a second message from the target EES, where the second message is a response message of the first message, and the second message is used to indicate whether relocation of the application of the terminal apparatus is allowed.

Optionally, the processing unit 303 is configured to determine whether to relocate the application of the terminal apparatus based on at least one of the following information: user plane path change information of the terminal apparatus, relocation capability information of the application of the terminal apparatus, relocation requirement information of the application of the terminal apparatus, or information about whether the target EES supports relocation of the application of the terminal apparatus.

Optionally, the processing unit 303 is further configured to determine to relocate the application of the terminal apparatus in at least one of the following manners:

when a user plane path of the terminal apparatus changes, the source EES determines to relocate the application of the terminal apparatus; or when the relocation capability information of the application of the terminal apparatus indicates that relocation is supported, the source EES determines to relocate the application of the terminal apparatus; or when the relocation requirement information of the application of the terminal apparatus indicates that the application of the terminal apparatus needs to be relocated, the source EES determines to relocate the application of the terminal apparatus; or when determining, based on the information about whether the target EES supports relocation of the application of the terminal, that the target EES supports relocation of the application of the terminal, the source EES determines to relocate the application of the terminal apparatus.

Optionally, the processing unit 303 is further configured to obtain the relocation capability information of the application of the terminal apparatus and the relocation requirement information of the application of the terminal apparatus from a source application instance, where the source application instance is an application instance that is of the application and that is associated with the source EES.

Optionally, the receiving unit 302 is further configured to receive a third message from a source application instance, where the third message is used to request to relocate the application of the terminal apparatus, and the source application instance is an application instance that is of the application and that is associated with the source EES.

Optionally, the sending unit 301 is further configured to send, by the source EES, a notification message to the source application instance, where the notification message is used to notify the source application instance that a user plane path of the terminal apparatus changes.

Optionally, the receiving unit 302 is further configured to receive a fourth message from the target EES, where the fourth message includes information about at least one application instance on the target EES; and the processing unit 303 is further configured to determine, based on the fourth message, whether the at least one application instance includes an application instance of the application of the terminal apparatus.

Optionally, the sending unit 301 is further configured to send a request message to the target EES, where the request message includes the identifier of the application; and the receiving unit 302 is further configured to receive a response message of the request message from the target EES, where the response message of the request message is used to indicate whether an application instance of the application exists on the target EES.

Optionally, the processing unit 303 is further configured to: obtain, based on the user plane path change information of the terminal apparatus, a data network access identifier DNAI after the user plane path changes; and determine information about the target EES to which the DNAI belongs.

Optionally, the first message further includes information about a core network element communicating with the application.

Optionally, when the second message is used to indicate that relocation of the application is allowed, the second message includes at least one of the following: the identifier of the terminal apparatus, the identifier of the application, an address of a target application instance, or a port number used for relocation of the application, where the target application instance is an application instance that is of the application and that is associated with the target EES.

Optionally, the sending unit 301 is further configured to send a fifth message to the source application instance, where the fifth message is used to request to relocate the application of the terminal apparatus, and the source application instance is the application instance that is of the application and that is associated with the source EES.

Optionally, the sending unit 301 is further configured to send a context of the application of the terminal apparatus to the target EES.

Optionally, the receiving unit 302 is further configured to receive the context of the application of the terminal apparatus from the source application instance.

Optionally, the sending unit 301 is further configured to: after the context of the application of the terminal apparatus is transmitted, send a downlink packet end indication to a user plane network element, and send an uplink packet end indication to the target EES.

When the application relocation apparatus 300 is configured to perform an operation performed by a target EES, the receiving unit 302 is configured to receive a first message from the source EES, where the first message is used to request to relocate an application of a terminal apparatus, and the first message includes an identifier of the terminal apparatus and an identifier of the application; and the sending unit 301 is configured to send a second message to the source EES, where the second message is a response message of the first message, and the second message is used to indicate whether relocation of the application of the terminal apparatus is allowed.

Optionally, the sending unit 301 is further configured to send a third message to a target application instance, where the third message is used to request to relocate the application of the terminal apparatus, the target application instance is an application instance that is of the application and that is associated with the target EES, and the third message includes the identifier of the terminal apparatus.

Optionally, the third message includes an IP address of a source application instance, and the source application instance is an application instance that is of the application and that is associated with the source EES.

Optionally, the processing unit 303 is configured to determine, based on the first message, whether relocation of the application of the terminal apparatus is allowed.

Optionally, the sending unit 301 is further configured to: when the processing unit 303 determines that relocation of the application of the terminal apparatus is allowed, send, to the source EES, the second message used to indicate that relocation of the application of the terminal apparatus is allowed.

Optionally, when the second message is used to indicate that relocation of the application of the terminal apparatus is allowed, the second message includes at least one of the following information: the identifier of the terminal apparatus, the identifier of the application, an address of the target application instance, or a port number used for relocation of the application, where the target application instance is the application instance that is of the application and that is associated with the target EES.

Optionally, the first message further includes information about a core network element communicating with the terminal apparatus.

When the application relocation apparatus 300 is configured to perform an operation performed by a terminal apparatus, the receiving unit 302 is configured to receive an IP address of a target application instance; and the processing unit 303 is configured to add a transmission connection by using the IP address, where the transmission connection is used to transmit data of an application of the terminal apparatus, and the target application instance is an instance of the application.

The receiving unit 302 is further configured to receive the IP address of the target application instance from a source application instance or a source edge enabler platform.

Division into modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 4:
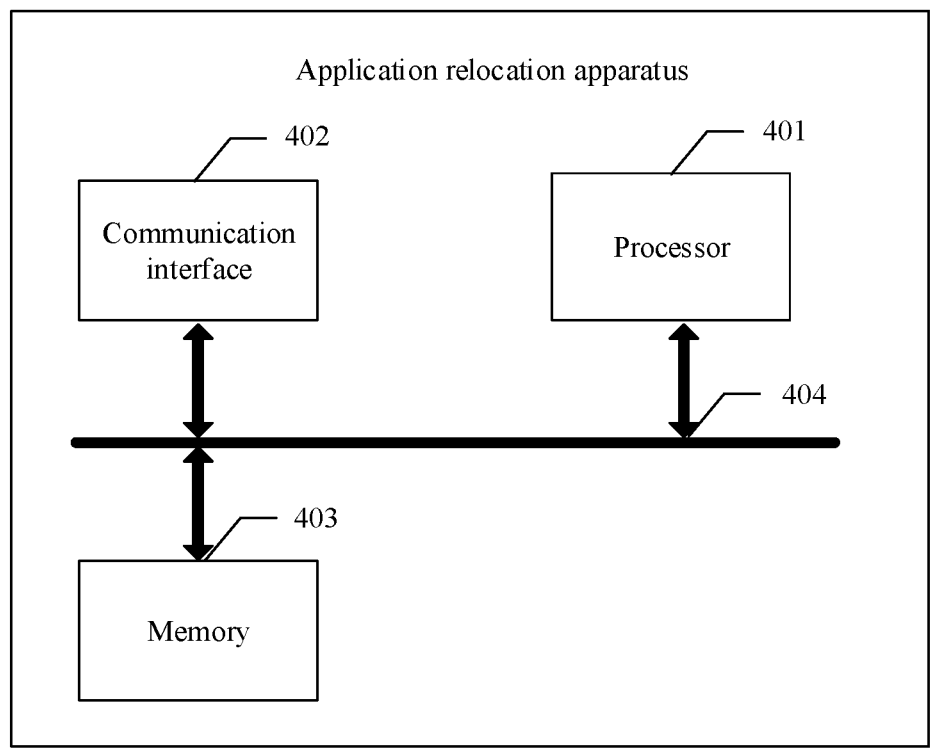
FIG. 4 is a second schematic diagram of a structure of an application relocation apparatus according to an embodiment of this application.

When the integrated module may be implemented in the form of hardware, the application relocation apparatus may be shown in FIG. 4, and the application relocation apparatus may be a source EES, a target EES, or a chip in a terminal apparatus. The application relocation apparatus may include a processor 401, a communication interface 402, and a memory 403. The processing unit 303 may be the processor 401. The sending unit 301 and the receiving unit 302 may be the communication interface 402.

When the application relocation apparatus is configured to perform an operation performed by a source EES, the processor 401 may be configured to: invoke the communication interface 402 to send a first message to a target EES, where the first message is used to request to relocate an application of a terminal apparatus, and the first message includes an identifier of the terminal apparatus and an identifier of the application; and receive a second message from the target EES, where the second message is a response message of the first message, and the second message is used to indicate whether relocation of the application of the terminal apparatus is allowed.

When the application relocation apparatus is configured to perform an operation performed by a source EES, the processor 401 may be configured to: invoke the communication interface 402 to receive a first message from the source EES, where the first message is used to request to relocate an application of a terminal apparatus, and the first message includes an identifier of the terminal apparatus and an identifier of the application; and send a second message to the source EES, where the second message is a response message of the first message, and the second message is used to indicate whether relocation of the application of the terminal apparatus is allowed.

The processor 401 may be further configured to perform other corresponding steps in the foregoing method embodiment. For details, refer to the foregoing method embodiment. Details are not described herein again.

The processor 401 may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to constitute a semiconductor chip. For example, the processor and another circuit (for example, an encoding/decoding circuit, a hardware acceleration circuit, or various bus and interface circuits) may constitute system on chip (SoC). Alternatively, the processor may be integrated into an ASIC as a built-in processor of the ASIC, and the ASIC integrated with the processor may be independently packaged or may be packaged with another circuit. In addition to the core configured to perform the operation or processing by executing the software instructions, the processor may further include a necessary hardware accelerator, for example, a field programmable gate array (FPGA), a programmable logic device (PLD), or a logic circuit that implements a dedicated logic operation.

The memory 403 may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited herein.

The processor 401 is configured to execute the program code stored in the memory 403, and is specifically configured to perform an action of the processing unit 303. Details are not described herein again in this application.

In this embodiment of this application, a specific connection medium between the communication interface 401, the processor 402, and the memory 403 is not limited. In this embodiment of this application, the memory 403, the processor 402, and the communication interface 401 are connected through a bus 404 in FIG. 4, and the bus is represented by using a thick line in FIG. 4. A connection manner between other components is merely an example for description, and is not limited thereto. The bus may be classified into an address bus, a data bus, a control bus, and the like. For ease of representation, only one thick line is used to represent the bus in FIG. 4, but this does not mean that there is only one bus or only one type of bus.

Figure 5:
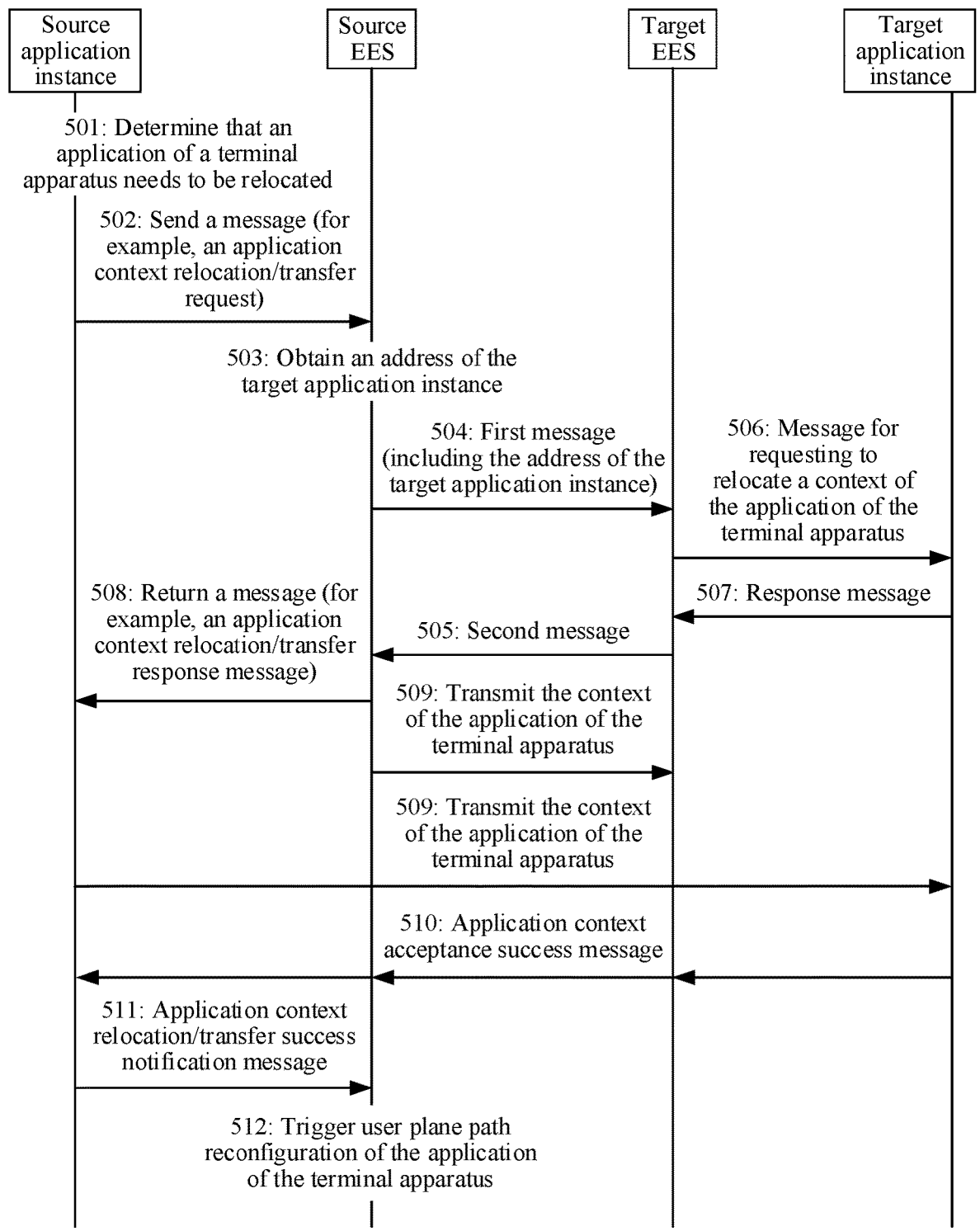
FIG. 5 is a second schematic flowchart of an application relocation method according to an embodiment of this application.

Based on descriptions of the foregoing embodiments, as shown in FIG. 5, an embodiment of this application further provides an application relocation method. A specific procedure is described as follows.

S501: A source application instance determines that an application of a terminal apparatus needs to be relocated.

For example, when the following several cases occur, the source application instance determines that the application of the terminal apparatus needs to be relocated.

(1) The source application instance determines that a location of the terminal apparatus moves out of a service area of the current source application instance. In this case, because an application client on the terminal apparatus runs on the terminal apparatus, the source application instance may determine that a location of the application client moves out of the service area of the current source application instance, and the source application instance may further determine that a location of an application user using the application client moves out of the service area of the current source application instance.

(2) The source application instance receives, from the application client (app client), a request for relocating a context of the application.

(3) The source application instance is overloaded and determines to relocate a part of application clients to another target application instance of the application.

S502: The source application instance sends a message to a source EES, for example, the message is an application context relocation/transfer request, and the source EES receives the message from the source application instance.

The message is used to relocate the application of the terminal apparatus, and the message may carry the following parameter: information about the terminal apparatus. For example, the information about the terminal apparatus may be at least one of the following: an identifier of the terminal apparatus, the location of the terminal apparatus, an identifier of the application client, or an identifier of the application user. The application context relocation/transfer request may further carry an identifier of the application, such as an FQDN or a URL, and address information of the source application instance, such as an IP address or a URL address.

In an implementation, S502 may be further implemented in the following manner. A form of a service API call is used. To be specific, the source application instance calls the API of the source EES for relocation of a context of the application, and provides an input parameter of the API. The input parameter is the same as a parameter in the context relocation/transfer request. The application is executable software that can implement a specific function, for example, various applications (APPs) on a mobile terminal. For other descriptions of the application, refer to the foregoing related descriptions.

S503: The source EES obtains an address of a target application instance. The address of the target application instance is, for example, an IP address, a port number, or a URL address. The source EES may further obtain an identifier of the target application instance.

The target application instance is an application instance allowed to accept relocation of the application.

The source EES may obtain the address of the target application instance from an edge data network configuration server (EDN CS), and may further obtain information about a target EES associated with the target application instance.

A relationship between the target application instance and the target EES associated with the target application instance may be understood as that the target application instance is registered with the target EES, or may be understood as that the target application instance is controlled or managed by the target EES, or the target EES provides an edge enablement service for the target application instance. The EDN CS may determine, based on location information of the terminal apparatus (where the location information of the terminal apparatus is equivalent to location information of the application client or the application user), and topology information and communication network information of an application instance in an edge data network, the target application instance and the target EES corresponding to the target application instance. The EDN CS may obtain the location information of the terminal apparatus from the S-EAS in S502; or the EDN CS obtains the location information of the terminal apparatus from a 3GPP network, or subscribes to and obtains the location information of the terminal apparatus from a user corresponding to the terminal apparatus. The topology information of the application instance in the edge data network is as follows: The application instance is registered with a specific target EES in the edge data network, the target EES is controlled or managed by a specific target EES, or the edge data network includes a plurality of or all of edge data networks.

For example, the EDN CS may select a target application instance that is nearest to the location of the terminal apparatus (which is equivalent to the location of the application client or the application user) and that meets a service requirement of the application and a target EES associated with the target application instance. When the target EES is used as a proxy of the target application instance, the IP address of the target application instance may alternatively be an IP address managed by the target EES, and the port number of the target application instance may alternatively be a port number managed by the target EES. In practice, an EES can manage a plurality of IP addresses and a plurality of port numbers.

S504: The source EES sends a first message to the target EES, and the target EES receives the first message from the source EES.

The first message may include the address of the target application instance. The address of the target application instance is obtained by the source EES in S503. For information that may be further included in the first message, refer to the descriptions in S201. For other related descriptions of this step, refer to the descriptions in S201.

The target EES selects the target application instance or determines the target application instance based on the first message. Specifically, the target EES may select, based on the address of the target application instance carried in the first message, an application instance indicated by the address of the target application instance as the target application instance.

S501 and S502 are optional steps.

S505: The target EES sends a second message to the source EES, and the source EES receives the second message from the target EES.

The second message is a response message of the first message. The second message is used to indicate whether relocation of the application of the terminal apparatus is allowed, and also indicates whether relocation of the application of the terminal apparatus is accepted. Whether relocation of the application of the terminal apparatus is allowed may be specifically understood as whether relocation of the context of the application of the terminal apparatus is allowed, or whether relocation of the context of the application of the terminal apparatus is accepted. The target EES may determine, based on whether information about application instances managed by the target EES includes the application instance corresponding to the application of the terminal apparatus, or based on a load status of the application instance corresponding to the application of the terminal apparatus, whether relocation of the application of the terminal apparatus is allowed. Similar to the first message, the second message is an example of a message name, and a specific name of the message is not limited in this application. For example, the second message may be referred to as an application relocation response or an application context relocation/transfer response.

After S504 and before S505, the following steps may be further included.

S506: The target EES sends a message to the target application instance, to request to relocate the application of the terminal apparatus. The target application instance receives the message from the target EES.

The target application instance is a target application instance determined by the target EES based on the first message.

The message may be referred to as an application relocation request or an application context relocation/transfer request. The message includes the identifier of the terminal apparatus, and may further include information about a core network element connected to the application of the terminal apparatus. For descriptions of parameters carried in the message, refer to the foregoing descriptions of the related parameters.

The application of the terminal apparatus and the target application instance correspond to a same application.

S507: The target application instance returns a response message to the target EES, where the response message is used to respond to the message received in S506. The target EES receives the response message from the target application instance.

The response message may be referred to as an application relocation response or an application context relocation/transfer response. The response message may carry the information about the terminal apparatus. For an explanation of the information about the terminal apparatus, refer to the foregoing explanation of the information about the terminal apparatus.

Optionally, after receiving the message sent in S506, the target application instance may further allocate an IP address and/or a port number for relocation of the application of the terminal apparatus, to relocate the application of the terminal apparatus. Specifically, it may be understood that the IP address and/or the port number are/is used to receive the context that is of the application of the terminal apparatus and that needs to be relocated. The response message may carry the IP address and/or the port number.

After S505, the following steps may be further included.

S508: The source EES sends the response message for the message received in S502 to the source application instance. For example, the message in S502 is an application context relocation/transfer request, and the response message is an application context relocation/transfer response message. The source application instance receives the response message from the source EES. For example, the source application instance receives the application context relocation/transfer response message from the source EES.

The message is used to indicate that the source application instance may start relocation of the application of the terminal apparatus, where that the source application instance may start relocation of the application of the terminal apparatus may also be understood as that the application context of the application of the terminal apparatus may start to be transmitted, or establishment of a context transmission channel is completed. The message may include the information about the terminal apparatus, the address of the target application instance (the IP address or the URL address of the target application instance), and receiving information used to transmit the context of the application, such as an IP address and/or a port number of a receiver side (the target EES or the target application instance).

S509: Transmit the context of the application of the terminal apparatus.

In an implementation, the source EES relocates (transfer) the context of the application of the terminal apparatus to the target EES, and the target EES receives the context that is of the application of the terminal apparatus and that is sent by the source EES.

The source EES and the target EES may perform context transmission based on a port that is used for relocation of the application and that is indicated in the second message.

In another implementation, the source application instance relocates the context of the application of the terminal apparatus to the target application instance, and the target application instance receives the context that is of the application of the terminal apparatus and that is sent by the source application instance.

The source application instance and the target application instance may perform context transmission based on the port that is used for relocation of the application and that is allocated by the target application instance in S507.

In still another implementation, the source application instance may transmit the context of the application of the terminal apparatus to the target EES through the source EES, and the target EES transfers the received context of the application of the terminal apparatus to the target application instance.

S510: Optionally, the target application instance sends an application context acceptance success message to the target EES, the target EES sends the context acceptance success message to the source EES, and the source EES sends the application context acceptance success message to the source application instance.

After receiving of the context of the application of the terminal apparatus is completed, the target application instance determines that the context of the application is successfully accepted. In other words, the context of the application may be reestablished in the target application instance to form the context that is of the application and that can be used by a client of the application of the terminal apparatus.

S511: Optionally, the source application instance sends an application context relocation/transfer success notification message to the source EES.

S512: Trigger user plane path reconfiguration of the application of the terminal apparatus.

In an implementation, the source EES triggers an SMF to insert a new user plane path for the application of the terminal apparatus, and insert an uplink classifier (UL CL) or a branch point (BP).

In another implementation, this step may alternatively be performed by the target EES, and the target EES may perform this step after S506 or after S509.

In another implementation, the source application instance or the target application instance may trigger the user plane path reconfiguration of the application of the terminal apparatus. Specifically, the source application instance or the target application instance triggers an SMF to insert a new user plane UP path for the application of the terminal apparatus, and insert an uplink classifier (UL CL) or a branch point (BP). This action may be performed after S506 or after S509.

The embodiment shown in FIG. 5 is afferent from the embodiment shown in FIG. 2A and FIG. 2B in that the source EES determines the target application instance, or the source EES obtains the address of the target application instance, and sends the address of the target application instance to the target EES associated with the target application instance, so that the source EES and the target EES can quickly and successfully establish a transmission channel used for relocation of the context of the application. Therefore, a case in which the target application instance does not exist on the target EES selected by the source EES may be avoided because the source EES selects the target EES and the target EES selects the target application instance.

Figure 6:
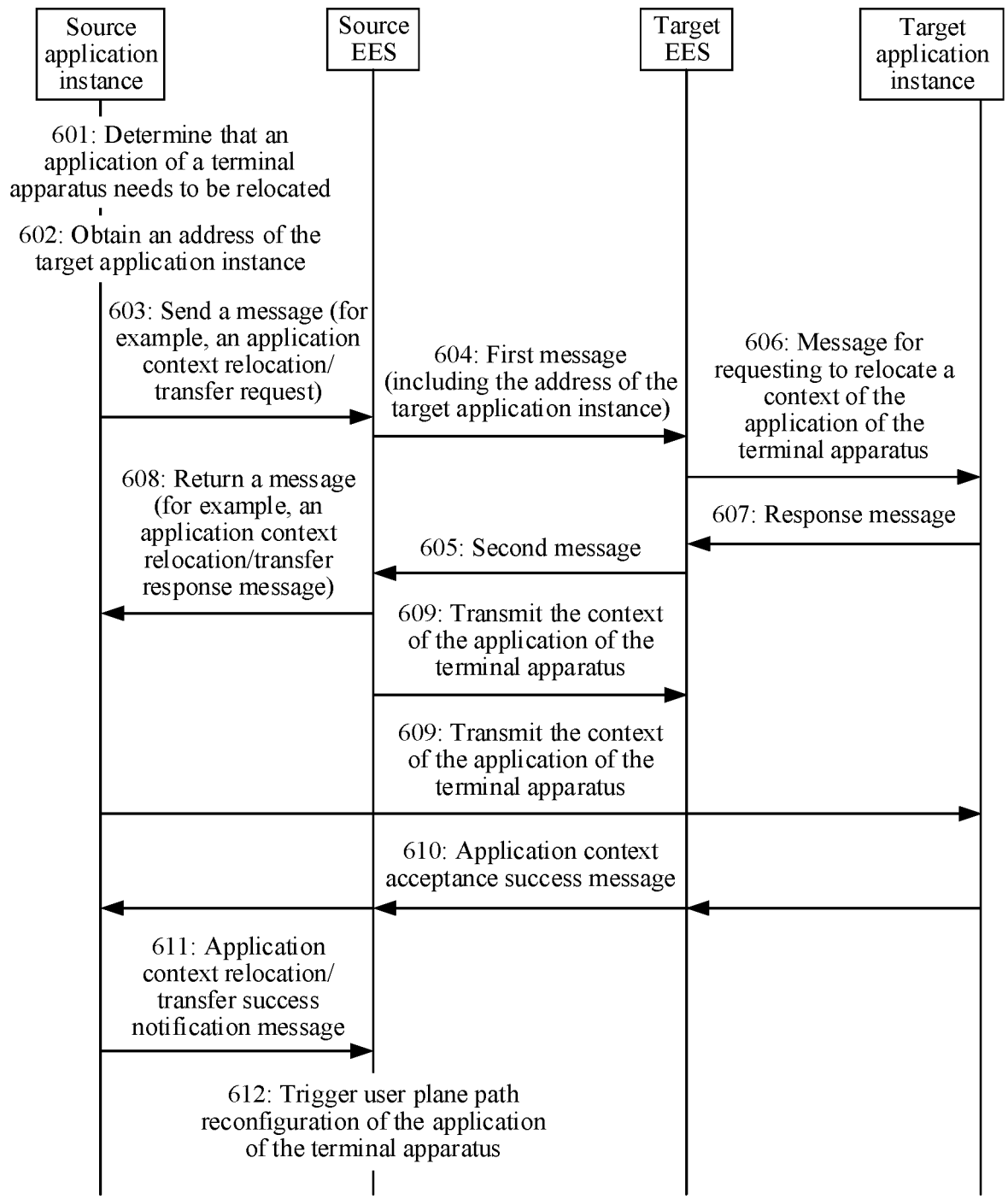
FIG. 6 is a third schematic flowchart of an application relocation method according to an embodiment of this application.

Based on descriptions of the foregoing embodiments, as shown in FIG. 6, an embodiment of this application further provides an application relocation method. A specific procedure is described as follows.

S601: Same as S501.

S602: A source application instance obtains address information of a target application instance.

For content included in the address information of the target application instance, refer to the foregoing descriptions in S503.

S603: The source application instance sends a message to a source EES, for example, the message is an application context relocation/transfer request, and the source EES receives the message from the source application instance, for example, receives the application context relocation/transfer request.

The message, for example, the application context relocation/transfer request, may carry the following parameter: an address of a target application instance, and may further carry an identifier of an application such as an FQDN, information about a terminal apparatus such as an identifier of the terminal apparatus, a location of the terminal apparatus, an identifier of an application client or an identifier of an application user, or an IP address of the source application instance. Specific description information of the parameter is the same as that in S503.

The source EES obtains information about a target EES associated with the target application instance. The source EES may obtain, from an edge data network configuration server (EDN CS), the information about the target EES associated with the target application instance.

S604 to S612 are the same as S504 to S512.

In the embodiment shown in FIG. 6, the source EES and the target EES can quickly and successfully establish a transmission channel used for relocation of a context of the application. Therefore, a case in which the target application instance does not exist on the target EES selected by the source EES may be avoided because the source EES selects the target EES and the target EES selects the target application instance.

Figure 7:
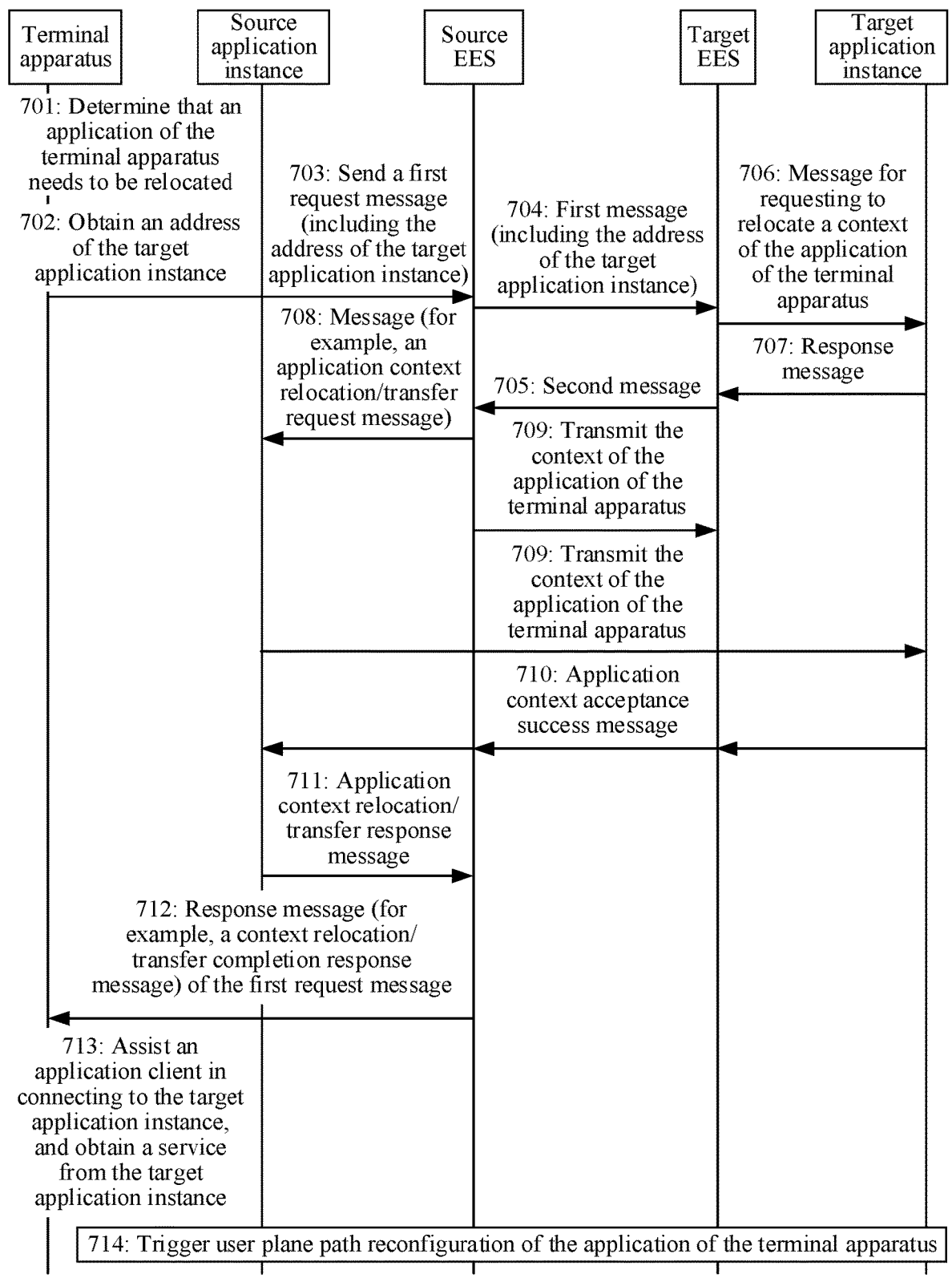
FIG. 7 is a fourth schematic flowchart of an application relocation method according to an embodiment of this application.

Based on descriptions of the foregoing embodiments, as shown in FIG. 7, an embodiment of this application further provides an application relocation method. A specific procedure is described as follows.

S701: A terminal apparatus determines that an application of a terminal apparatus needs to be relocated.

An enabling client is located in the terminal apparatus. In this embodiment of this application, an operation performed by the terminal apparatus may be understood as an operation performed by the enabling client. For example, that the terminal apparatus determines that the application of the terminal apparatus needs to be relocated may be understood as the enabling client determines that the application of the terminal apparatus needs to be relocated, where there may be one or more applications of the terminal apparatus. In this embodiment, one application is used as an example for description. When there are a plurality of applications, a processing manner of each application is the same as a processing manner of the one application in this embodiment. When the enabling client performs an operation, a message exchanged between the enabling client and another device may be implemented according to an application layer protocol (such as an HTTP protocol).

For example, when the following several cases occur, the terminal apparatus determines that the application of the terminal apparatus needs to be relocated.

(1) The terminal apparatus determines that a location of the terminal apparatus moves out of a service area of the current source application instance. In this case, because an application client on the terminal apparatus runs on the terminal apparatus, the source application instance may determine that a location of the application client moves out of the service area of the current source application instance, and the source application instance may further determine that a location of an application user using the application client moves out of the service area of the current source application instance.

(2) That the terminal apparatus receives, from the application client (app client), a request (or an API call) for relocating a context of the application may be equivalently understood as that the enabling client receives, from the application client (app client), a request for relocating the context of the application.

(3) The terminal apparatus detects that quality of the application in the source application instance is relatively poor. For example, the terminal apparatus detects that connection quality between the application and the current source application instance is poor. For example, a delay is high or a packet loss rate is large.

S702: The terminal apparatus obtains an address of a target application instance.

That the terminal apparatus obtains the address of the target application instance may be equivalently understood as that the enabling client obtains the address of the target application instance, and the target application instance is an application instance allowed to accept relocation of the application of the terminal apparatus.

For example, the terminal apparatus sends an application instance discovery request to an EDN CS (even if the enabling client sends the application instance discovery request to the EDN CS through the terminal apparatus).

The application instance discovery request may include an identifier of the application, an identifier of the terminal apparatus, the location of the terminal apparatus, an identifier of the application client, or an identifier of the application user, and may further include information (for example, an identifier, a URL, and an IP address) about the source application instance. The EDN CS selects an optimal target application instance that can provide a service for the application. Optionally, the EDN CS further determines a target EES associated with the target application instance. Generally, the target application instance is different from the source application instance. If the EDN CS returns the source application instance to the terminal apparatus, subsequent steps are not performed. The target application instance and the source application instance may be in a same edge data network, or the selected target application instance may be in another edge data network different from an edge data network in which the source application instance is located. The edge data network may also be understood as a local data network, an edge network, or an edge data center.

S701 and S702 are optional steps.

S703: When the application of the terminal apparatus needs to be relocated, the terminal apparatus sends a first request message to a source edge enabler server, and the source edge enabler server receives the first request message from the terminal apparatus.

That the terminal apparatus sends the first request message to the source edge enabler server may be further understood as that the enabling client sends the first request message to the source edge enabler server through the terminal apparatus. That the source edge enabler server receives the first request message from the terminal apparatus may be further understood as that the source edge enabler server receives, from the terminal apparatus, the first request message from the enabling client.

The first request message is used to request to relocate the application of the terminal apparatus (which may be equivalently understood as requesting to relocate the application context of the application of the terminal apparatus).

The first request message includes the address of the target application instance. For related descriptions of the address of the target application instance (for example, an optional form of the target application instance), refer to the descriptions in S503. Details are not described again. The first message may further include the information about the terminal apparatus, the information about the source application instance, the identifier of the application, and information about a target edge enabler server associated with the target application instance.

It should be noted that if the first request message does not include the information about the target edge enabler server associated with the target application instance, the source EES obtains, based on the address of the target application instance, information about a target application enabler server associated with the target application instance. Optionally, the following steps may be further included.

S704 to S707 are the same as S504 to S507.

S708: The source EES sends a request message to the source application instance, where the request message is used to indicate that the source application instance may start relocation of the application context of the application of the terminal apparatus. For example, an application context relocation/transfer request message is received by the source application instance from the source EES.

The message further equivalently indicates that establishment of an application context transmission channel for relocating the application of the terminal apparatus is completed. The request message may include the information about the terminal apparatus, the address of the target application instance (an IP address or a URL address of the target application instance), and receiving information used to transmit the context of the application, such as an IP address and a port number of a receiver side (the target EES or the target application instance).

S709 and S710 are the same as S509 and S510.

S711: The source application instance sends, to the source EES, a response message of the request message received in S708, for example, an application context relocation/transfer response message. The source EES receives the response message from the source application instance. This step may also be performed after S708 and before S709.

S712: The source EES sends a response message of the first request message to the terminal apparatus, for example, a context relocation/transfer completion response message, and the terminal apparatus receives the response message of the first request message from the source EES.

S713: The terminal apparatus assists the application client in connecting to the target application instance, and obtains a service from the target application instance.

S714: Trigger user plane path reconfiguration (reconfiguration) of the application of the terminal apparatus.

In an implementation, the source EES triggers an SMF to insert a new user plane UP path for the application of the terminal apparatus, and insert an uplink classifier (UL CL) or a branch point (BP).

In another implementation, this step may alternatively be performed by the target EES.

In another implementation, the source application instance or the target application instance may trigger the user plane path reconfiguration of the application of the terminal apparatus. Specifically, the source application instance or the target application instance triggers an SMF to insert anew user plane UP path for the application of the terminal apparatus, and insert an uplink classifier (UL CL) or a branch point (BP).

This action may alternatively be performed after S710, that is, S714 may be performed synchronously with S711, S712, or S713.

In the embodiment shown in FIG. 7, the source EES and the target EES can quickly and successfully establish a transmission channel used for relocation of a context of the application. Therefore, a case in which the target application instance does not exist on the target EES selected by the source EES may be avoided because the source EES selects the target EES and the target EES selects the target application instance.

In the embodiments described in FIG. 5 to FIG. 7, any quantity of steps may form a solution that needs to be protected in the embodiments of this application, and remaining steps are optional steps.

The embodiments described in FIG. 5 to FIG. 7 may also be implemented through the application relocation apparatus 300 or the application relocation apparatus shown in FIG. 4.

An embodiment of this application provides a computer storage medium. The computer storage medium stores a computer program, and the computer program includes instructions used to perform the application relocation methods provided in the foregoing embodiments.

An embodiment of this application provides a computer program product including instructions. When the computer program product runs on a computer, the computer is enabled to perform the application relocation methods provided in the foregoing embodiments.

An embodiment of this application further provides a chip. The chip includes a processor and an interface circuit. The interface circuit is coupled to the processor. The processor is configured to run a computer program or instructions, to implement the foregoing application relocation methods. The interface circuit is configured to communicate with another module other than the chip.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. In this way, this application is intended to cover these modifications and variations of embodiments of this application provided that they fall within the scope of protection defined by the following claims and their equivalent technologies.

What is claimed is:

1. An application relocation method, comprising:
receiving, by a source edge enabler server (EES) from a third generation partnership project (3GPP) core network, a third message indicating a terminal apparatus user plane path change;
sending, by the source EES to a target EES in accordance with the third message, a first message that is used to request to relocate an application of the terminal apparatus, wherein the first message comprises;
an identifier of the terminal apparatus, and
an identifier of the application; and
receiving, by the source EES from the target EES in response to the first message, a second message that is used to indicate whether a relocation of the application of the terminal apparatus is allowed.

2. The method according to claim 1, further comprising:
determining, by the source EES in response to the third message, to relocate the application of the terminal apparatus.

3. The method according to claim 1, further comprising:
sending, by the source EES to a source application instance, a fourth message that is used to indicate the user plane path of the terminal apparatus has changed, and wherein the fourth message is a request to determine whether to relocate the application of the terminal apparatus;
receiving, by the source EES from the source application instance, a sixth message that is a request to relocate the application of the terminal apparatus.

4. The method according to claim 1, wherein the first message further comprises an address of a target application instance, and wherein the target application instance is an application instance that is allowed to accept the relocation of the application.

5. The method according to claim 1, wherein, in accordance with the second request being used to indicate that the relocation of the application is allowed, the second message comprises at least one of the group consisting of:
the identifier of the terminal apparatus,
the identifier of the application, an address of a target application instance, and
a port number used for the relocation of the application; and
wherein the target application instance is an application instance that belongs to the application and is associated with the target EES.

6. The method according to claim 1, further comprising:
sending, by the source EES to a source application instance, a fifth message that is used to request to relocate the application of the terminal apparatus, wherein the source application instance is an application instance that belongs to the application and is associated with the source EES.

7. The method according to claim 1, further comprising:
receiving, by the target EES, the first message from the source EES; and
sending, by the target EES, the second message to the source EES.

8. The method according to claim 7, wherein the first message further comprises an address of a target application instance, and
wherein the method further comprises:
selecting, by the target EES, the target application instance indicated by the address of the target application instance in the first massage.

9. The method according to claim 7, further comprising:
determining, by the target EES based on the first message, whether the relocation of the application of the terminal apparatus is allowed, and
wherein the sending the second message comprises:
sending, by the target EES to the source EES in response to determining that the relocation of the application of the terminal apparatus is allowed, the second message to indicate that the requested relocation of the application of the terminal apparatus is allowed.

10. The method according to claim 7, wherein, in accordance with the second request being used to indicate that the relocation of the application is allowed, the second message comprises at least one of the group consisting of:
the identifier of the terminal apparatus,
the identifier of the application, an address of a target application instance, and
a port number used for the relocation of the application; and
wherein the target application instance is the application instance that belongs to the application and is associated with the target EES.

11. The method according to claim 3, further comprising:
receiving, by the source application instance, the fourth message;
determining, by the source application instance in response to the fourth message, to relocate the application of the terminal apparatus; and
sending the sixth message to the source EES.

12. An apparatus, comprising at least one processor, wherein
the at least one processor is configured to read instructions from at least one memory coupled to the processor and execute the instructions to cause the apparatus to:
receive, from a third generation partnership project (3GPP) core network, a third message indicating a terminal apparatus user plane path change;
send, to a target edge enabler server (EES) in accordance with the third message, a first message that is used to request to relocate an application of the terminal apparatus, wherein the first message comprises:
an identifier of the terminal apparatus, and
an identifier of the application; and
receive, from the target EES in response to the first message, a second message that is used to indicate whether a relocation of the application of the terminal apparatus is allowed.

13. The apparatus according to claim 12, wherein the processor is configured to execute the instructions further to cause the apparatus to:
determining, in response to the third message, to relocate the application of the terminal apparatus.

14. The apparatus according to claim 12, wherein the processor is configured to execute the instructions further to cause the apparatus to:
send, to a source application instance, a fourth message that is used to indicate the user plane path of the terminal apparatus has changed, and wherein the fourth message is a request to determine whether to relocate the application of the terminal apparatus;
receive, from the source application instance, a sixth message that is used to request to relocate the application of the terminal apparatus.

15. The apparatus according to claim 13, wherein, in accordance with the second request being used to indicate that the relocation of the application is allowed, the second message comprises at least one of the group consisting of:
the identifier of the terminal apparatus,
the identifier of the application, an address of a target application instance, and
a port number used for the relocation of the application; and
wherein the target application instance is an application instance that belongs to the application and is associated with the target EES.

16. The apparatus according to claim 12, wherein the processor is configured to execute the instructions further to cause the apparatus to:
send, to a source application instance, a fifth message that is used to request to relocate the application of the terminal apparatus, wherein the source application instance is an application instance that belongs to the application and is associated with the apparatus.

17. A communication system, comprising:
a source edge enabler server (EES); and
a target EES, wherein
the source EES is configured to:
receive, from a third generation partnership project (3GPP) core network, a third message indicating a terminal apparatus user plane path change;
send, to the target EES in accordance with the third message, a first message that is used to request to relocate an application of the terminal apparatus, wherein the first message comprises:
an identifier of the terminal apparatus, and
an identifier of the application; and
receive, from the target EES in response to the first message, a second message that is used to indicate whether a relocation of the application of the terminal apparatus is allowed; and
the target EES is configured to:
receive the first message from the source EES; and
send, in response to receiving the first message, the second message to the source EES.

18. The system according to claim 17, wherein the source EES is further configured to:
determine, in response to the third message, to relocate the application of the terminal apparatus.

19. The system according to claim 17, wherein the source EES is further configured to:
send, to a source application instance, a fourth message that is used to indicate the user plane path of the terminal apparatus has changed, and wherein the fourth message is a request to determine whether to relocate the application of the terminal apparatus;

receive, from the source application instance, a sixth message that is a request to relocate the application of the terminal apparatus.

20. The system according to claim 19, further comprising:
the source application instance configured to:
  receive the fourth message;
  determine, in response to the fourth message, to relocate the application of the terminal apparatus; and
  send the sixth message to the source EES.

* * * * *

UNITED STATES PATENT AND TRADEMARK OFFICE
CERTIFICATE OF CORRECTION

PATENT NO. : 12,149,584 B2
APPLICATION NO. : 17/562742
DATED : November 19, 2024
INVENTOR(S) : Ge et al.

Page 1 of 1

It is certified that error appears in the above-identified patent and that said Letters Patent is hereby corrected as shown below:

In the Claims

Claim 1: Column 34, Line 30: "ratus, wherein the first message comprises;" should read as -- ratus, wherein the first message comprises: --.

Signed and Sealed this
Third Day of June, 2025

Coke Morgan Stewart
*Acting Director of the United States Patent and Trademark Office*